(12) United States Patent
Rugeland et al.

(10) Patent No.: US 12,192,832 B2
(45) Date of Patent: Jan. 7, 2025

(54) DETERMINING SECURITY KEYS

(71) Applicant: Telefonaktiebolaget LM Ericsson (PUBL), Stockholm (SE)

(72) Inventors: Patrik Rugeland, Stockholm (SE); Gunnar Mildh, Sollentuna (SE); Julien Muller, Rennes (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 352 days.

(21) Appl. No.: 17/765,348

(22) PCT Filed: Sep. 30, 2020

(86) PCT No.: PCT/EP2020/077387
§ 371 (c)(1),
(2) Date: Mar. 30, 2022

(87) PCT Pub. No.: WO2021/064032
PCT Pub. Date: Apr. 8, 2021

(65) Prior Publication Data
US 2022/0394565 A1 Dec. 8, 2022

Related U.S. Application Data

(60) Provisional application No. 62/907,846, filed on Sep. 30, 2019.

(51) Int. Cl.
*H04W 36/00* (2009.01)
*H04W 12/041* (2021.01)
(Continued)

(52) U.S. Cl.
CPC ..... *H04W 36/0027* (2013.01); *H04W 12/041* (2021.01); *H04W 36/0069* (2018.08);
(Continued)

(58) Field of Classification Search
CPC ......... H04W 36/0027; H04W 36/0069; H04W 12/041
See application file for complete search history.

(56) References Cited

U.S. PATENT DOCUMENTS

| 2015/0092750 A1* | 4/2015 | Huang | H04W 36/00692 370/331 |
| 2023/0164871 A1* | 5/2023 | Jung | H04W 12/0433 370/328 |

FOREIGN PATENT DOCUMENTS

| CN | 104969592 A | 10/2015 |
| WO | 2015 108382 A1 | 7/2015 |

(Continued)

OTHER PUBLICATIONS

3GPP TSG-RAN WG2 Meeting #107; Prague, Czech Republic; Change Request, Current Version 15.5.0; Title: Running CR for the introduction of NR mobility enhancement; Source to WG: Intel Corporation; Source to Tsg: R2 (R2-1909571)—Aug. 26-30, 2019.
(Continued)

*Primary Examiner* — Won Tae C Kim
(74) *Attorney, Agent, or Firm* — Baker Botts L.L.P.

(57) ABSTRACT

Examples of this disclosure include a method performed by a wireless device for determining security keys. The method comprises, for each candidate primary secondary cell (PS-Cell) of a plurality of candidate PSCells for conditional addition or conditional change by the wireless device for dual connectivity, receiving, from a network node, a respective value associated with the candidate PSCell, wherein the value associated with the candidate PSCell is different to the value associated with at least one other candidate PSCell. The method also comprises determining, for each of at least one candidate PSCell of the plurality of candidate PSCells, a respective security key for communications between the wireless device and the candidate PSCell, wherein the (Continued)

---

1502
For each candidate primary secondary cell (PSCell) of a plurality of candidate PSCells for conditional addition or change by the wireless device for dual connectivity, receiving, from a network node, a respective value associated with the candidate PSCell, wherein the value associated with the candidate PSCell is different to the value associated with at least one other candidate PSCell 1504
Determining, for each of at least one candidate PSCell of the plurality of candidate PSCells, a respective security key for communications between the wireless device and the candidate PSCell, wherein the respective security key is determined based on a master key and the respective value associated with the candidate PSCell

1500 respective security key is determined based on a master key and the respective value associated with the candidate PSCell.

19 Claims, 16 Drawing Sheets

(51) Int. Cl.
    *H04W 36/28*     (2009.01)
    *H04W 36/36*     (2009.01)
(52) U.S. Cl.
    CPC ......... *H04W 36/28* (2013.01); *H04W 36/362* (2023.05); *H04W 36/00835* (2018.08)

(56) References Cited

FOREIGN PATENT DOCUMENTS

| | | |
|---|---|---|
| WO | WO2019066628 A1 | 4/2019 |
| WO | 2020 091662 A1 | 5/2020 |
| WO | 2020 091667 A1 | 5/2020 |
| WO | 2020 112011 A1 | 6/2020 |
| WO | 2020 117118 A1 | 6/2020 |
| WO | 2021 015659 A1 | 1/2021 |

OTHER PUBLICATIONS

3GPP TSG RAN WG2 Meeting #107; Prague, Czech Republic; Source: Sharp; Title: Security Configuration for Conditional Handover (R2-1910807)—Aug. 26-30, 2019.
3GPP TSG-RAN WG2 Meeting #107; Prague, Czech Republic; Change Request, Current Version 15.6.0; Title: Running CR for the introduction of NR mobility enhancement; Source to WG: Intel Corporation; Source to TSG: R2 (R2-1911559)—Aug. 26-30, 2019.
3GPP TSG RAN Meeting #85; Newport Beach, USA; Source: Intel Corporation; Title: New WID: NR Mobility Enhancements (RP-192277 (Revision of RP-191885))—Sep. 16-20, 2019.
3GPP TSG RAN Meeting #85; Newport Beach, USA; Status Report to TSG (RP-192278 (revision of RP191884))—Sep. 16-20, 2019.
PCT International Search Report issued for International application No. PCT/EP2020/077387—Dec. 23, 2020.
PCT Written Opinion of the International Searching Authority issued for International application No. PCT/EP2020/077387—Dec. 23, 2020.
3GPP TS 38.331 version 15.7.0 Release 15; 5G; NR; Radio Resource Control (RRC); Protocol Specification (due to size, this reference has been split into 9 parts)—Oct. 2019.
3GPP TS 33.501 v15.6.0; Technical Specification; 3rd Generation Partnership Project; Technical Specification Group Services and System Aspects; Security architecture and procedures for 5G system (Release 15)—Sep. 2019.
3GPP TS 36.331 version 15.7.0 Release 15; LTE; Evolved Universal Terrestrial Radio Access (E-UTRA); Radio Resource Control (RRC); Protocol specification—Oct. 2019.
Second Review Opinion Notice issued for Chinese Patent Application Serial No. 202080068636.3—Apr. 11, 2024.
Search Report issued for Chinese Patent Application No. 2020800686363—Apr. 9, 2024.
3GPP TSG-RAN WG2#AH1807; Montreal, Canada, Jul. 2-6, 2018; Agenda Item: 10.2.6; Source: Ericsson; Title: RRC handling of SN Counter for NE-DC (Tdoc R2-1810284).
3GPP TSG-RAN WG2 Meeting #103bis; Chengdu, China, Oct. 8-12, 2018; Source: Huawei (Rapporteur); Title: [103#51] [NR late drop] MR-DC security aspects; Agenda Item: 10.5.1 (R2-1814693).
Office Action issued for Chinese Patent Application Serial No. 202080068636.3—Oct. 19, 2023.
Search Report issued for Chinese Patent Application Serial No. 2020800686363—Oct. 16, 2023.

\* cited by examiner

200

DETERMINING SECURITY KEYS

PRIORITY

This nonprovisional application is a U.S. National Stage Filing under 35 U.S.C. § 371 of International Patent Application Serial No. PCT/EP2020/077387 filed Sep. 30, 2020 and entitled "DETERMINING SECURITY KEYS" which claims priority to U.S. Provisional Patent Application No. 62/907,846 filed Sep. 30, 2019 both of which are hereby incorporated by reference in their entirety.

TECHNICAL FIELD

Examples of this disclosure relate to determining security keys, for example based on a master key and a respective value for each of a plurality of candidate primary secondary cells (PSCells).

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Conditional Handover

In NR Rel-15 it has been agreed that a User Equipment (UE) can be configured with conditional handover (CHO), where the UE receives one or multiple conditional configurations along with triggering conditions. During RAN2#105bis, the following was agreed:

Agreements
- 0: CHO is introduced in NR to solve robustness/reliability issue.
- 1: The LTE agreements below are applicable for NR:
- a/ CHO is defined as UE having network configuration for initiating access to a target cell based on configured condition(s).
- b/ Usage of conditional handover is decided by network. UE evaluates when the condition is valid.
- c/ Support configuration of one or more candidate cells for conditional handover:
  => FFS how many candidate cells (UE and network impacts should be clarified).
  => FFS how to include the CHO conditions in UE configuration
- d/ The baseline operation for Conditional HO procedure assumes HO command type of message contains HO triggering condition(s) and dedicated RRC configuration(s). UE accesses the prepared target when the relevant condition is met.
- e/ The baseline operation for Conditional HO assumes the source RAN remains responsible for RRC until UE successfully sends RRC Reconfiguration Complete message to target RAN.
- f/ RAN2 assumes late packet forwarding (i.e. not done immediately when the CHO target cells become prepared) could be suitable for CHO when there are multiple candidate target cells. Early packet forwarding can also be considered. Detailed decisions require RAN3 study.
- 2 Cell level quality is used as baseline for CHO execution condition;
  FFS: on whether beam quality is used as input for CHO execution condition.
- 3 RS type SSB can be used
  FFS: CSI-RS, use of more than one RS type
- 4 Ax events (entry condition) are used for CHO execution condition and A3/5 as baseline
  FFS: on other events
- 5 Trigger quantity for CHO execution condition (RSRP, RSRQ or RS-SINR) is configured by network.
  FFS: on multiple quantities.
  FFS: Enhancements to the above CHO framework to specifically address usage in FR2 (e.g. address high number of handovers, RLFs, etc)

The conditional triggering conditions are designed in the same way as the measurement report triggering conditions A3 (Neighbour becomes offset better than SpCell) and A5 (SpCell becomes worse than threshold1 and neighbour becomes better than threshold2) as was agreed in RAN2#106:

Agreements
- 2 The source cell decides on the condition for the execution of CHO.
- 3 The source cell adds the condition for the execution of CHO to the RRC message sent to UE.
- 4 Multiple CHO candidate cells can be sent in either one or multiple RRC messages. FFS on signalling details. FFS how CHO execution is handled.
- 5 CHO execution does not trigger measurement report.
- 6 On cell level A3/A5-like CHO execution condition shall be specified (other events will not be specified without clear justifications)

The procedure for conditional handover preparation that has been captured in the endorsed running CR (R2-1909571) is shown in FIG. 1, which shows an example of intra-AMF/UPF Conditional Handover 100. In addition, during RAN2#107, it was agreed to support conditional primary secondary cell (PSCell) addition or change, based on the solutions for conditional handover:

Agreements
1: Support conditional NR PSCell addition/change and reusing the conditional HO solution being developed. Supported for any architecture option with NR PSCell.
2 From RAN2 perspective conditional NR PSCell change can be supported for both intra-SN and inter-SN The NR mobility enhancements Work Item description was modified accordingly in RP-192277, including the following objective:

To specify the following solutions agreed during the above study phase.
[RAN2/RAN1/RAN3/RAN4]
To improve HO/SCG change reliability and robustness
Conditional handover based NR PSCell addition/change for any architecture option with NR PSCell;

Support for conditional handover to a PSCell addition or change means that the UE can be configured with one or more secondary cell groups to which the UE will connect if the conditions are met.

Access Stratum Key Derivation

In dual connectivity, the UE is configured with separate AS security keys for the bearers terminating the master node, and the bearers terminating in the secondary node. At connection establishment, or when a new $K_{AMF}$ is derived, the master key (KgNB) is derived based on the CN key $K_{AMF}$ (KAMF). However, at handover, the new KgNB is derived based on the existing KgNB (horizontal key derivation) or the next hop parameter (NH) (vertical key derivation). The initial NH parameter is derived from the KAMF and the original KgNB, while the subsequent NH are derived on the KAMF and the previous NH. In addition the new KgNB is also derived based on the target physical cell Id (PCI) and the target physical cell downlink frequency (ARFCN-DL).

When the UE derives the keys, it is informed whether it shall derive a new KAMF or not, and whether the KgNB derivation should be horizontal or vertical. If the network indicates that the UE shall derive a new KAMF, the UE also derives a new KgNB based on the new KAMF. If the KAMF is not changed, the network indicates whether the UE shall derive a new KgNB using horizontal or vertical key derivation, using the next-hop chaining count (NCC). The NCC is a 3 bit value (0 . . . 7), and if the UE receives a NCC value which is the same as it was for the previous KgNB key derivation, the UE shall perform a horizontal key derivation using the current KgNB as input to the derivation.

If the NCC is incremented (indicating a vertical key derivation), the UE shall derive a new NH based on the current NH and from that derive a new KgNB from that. This key chaining can be seen in FIG. 2, which shows an example of a model 200 for the handover key chaining. The key derivation is described in TS 33.501 v15.5.0, which is incorporated herein by reference.

If a UE is configured with dual connectivity, or more precisely configured with bearers terminated in a secondary node, the network configures the UE with two sets of keys, the master key (KgNB) and the secondary key (S-$K_{gNB}$ also known as $K_{SN}$). The S-$K_{gNB}$ (S-KgNB) is derived based on an 16 bit integer value (0 . . . 65525) called SK-Counter and the current KgNB. When the network adds the secondary node, the master node derives the S-KgNB and forwards it to the secondary node and also provides the UE with the SK-Counter allowing the UE to derive the S-KgNB itself.

When the secondary node is changed, or the secondary key need to be updated, the UE is provided with an updated SK-Counter value, and the master node derives a new S-KgNB which it sends to the secondary node (SN). This ensures that a given secondary key (S-$K_{gNB}$ also known as $K_{SN}$) is not used in multiple secondary nodes, i.e. the network ensures that the secondary key is always refreshed at SN change.

SUMMARY

One aspect of the present disclosure provides a method performed by a wireless device for determining security keys. The method comprises, for each candidate primary secondary cell (PSCell) of a plurality of candidate PSCells for conditional addition or conditional change by the wireless device for dual connectivity, receiving, from a network node, a respective value associated with the candidate PSCell, wherein the value associated with the candidate PSCell is different to the value associated with at least one other candidate PSCell. The method also comprises determining, for each of at least one candidate PSCell of the plurality of candidate PSCells, a respective security key for communications between the wireless device and the candidate PSCell, wherein the respective security key is determined based on a master key and the respective value associated with the candidate PSCell.

Another aspect of the present disclosure provides a method performed by a network node for determining security keys. The method comprises determining, for each candidate primary secondary cell (PSCell) of a plurality of candidate PSCells for conditional addition or conditional change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell. The method also comprises sending, for each candidate PSCell, the respective security key to a respective candidate secondary node associated with the candidate PSCell.

A further aspect of the present disclosure provides apparatus in a wireless device for determining security keys. The apparatus comprises a processor and a memory. The memory contains instructions executable by the processor such that the apparatus is operable to, for each candidate primary secondary cell (PSCell) of a plurality of candidate PSCells for conditional addition or conditional change by the wireless device for dual connectivity, receive, from a network node, a respective value associated with the candidate PSCell, wherein the value associated with the candidate PSCell is different to the value associated with at least one other candidate PSCell; and determine, for each of at least one candidate PSCell of the plurality of candidate PSCells, a respective security key for communications between the wireless device and the candidate PSCell, wherein the respective security key is determined based on a master key and the respective value associated with the candidate PSCell.

A still further aspect of the present disclosure provides apparatus in a network node for determining security keys. The apparatus comprises a processor and a memory. The memory contains instructions executable by the processor such that the apparatus is operable to determine, for each candidate primary secondary cell (PSCell) of a plurality of candidate PSCells for conditional addition or conditional change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell; and send, for each candidate PSCell, the respective security key to a respective candidate secondary node associated with the candidate PSCell.

An additional aspect of the present disclosure provides apparatus in a wireless device for determining security keys. The apparatus is configured to, for each candidate primary secondary cell (PSCell) of a plurality of candidate PSCells for conditional addition or conditional change by the wireless device for dual connectivity, receive, from a network node, a respective value associated with the candidate PSCell, wherein the value associated with the candidate PSCell is different to the value associated with at least one other candidate PSCell; and determine, for each of at least one candidate PSCell of the plurality of candidate PSCells, a respective security key for communications between the wireless device and the candidate PSCell, wherein the respective security key is determined based on a master key and the respective value associated with the candidate PSCell.

Another aspect of the present disclosure provides apparatus in a network node for determining security keys. The apparatus is configured to determine, for each candidate primary secondary cell (PSCell) of a plurality of candidate PSCells for conditional addition or conditional change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell; and send, for each candidate PSCell, the respective security key to a respective candidate secondary node associated with the candidate PSCell.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
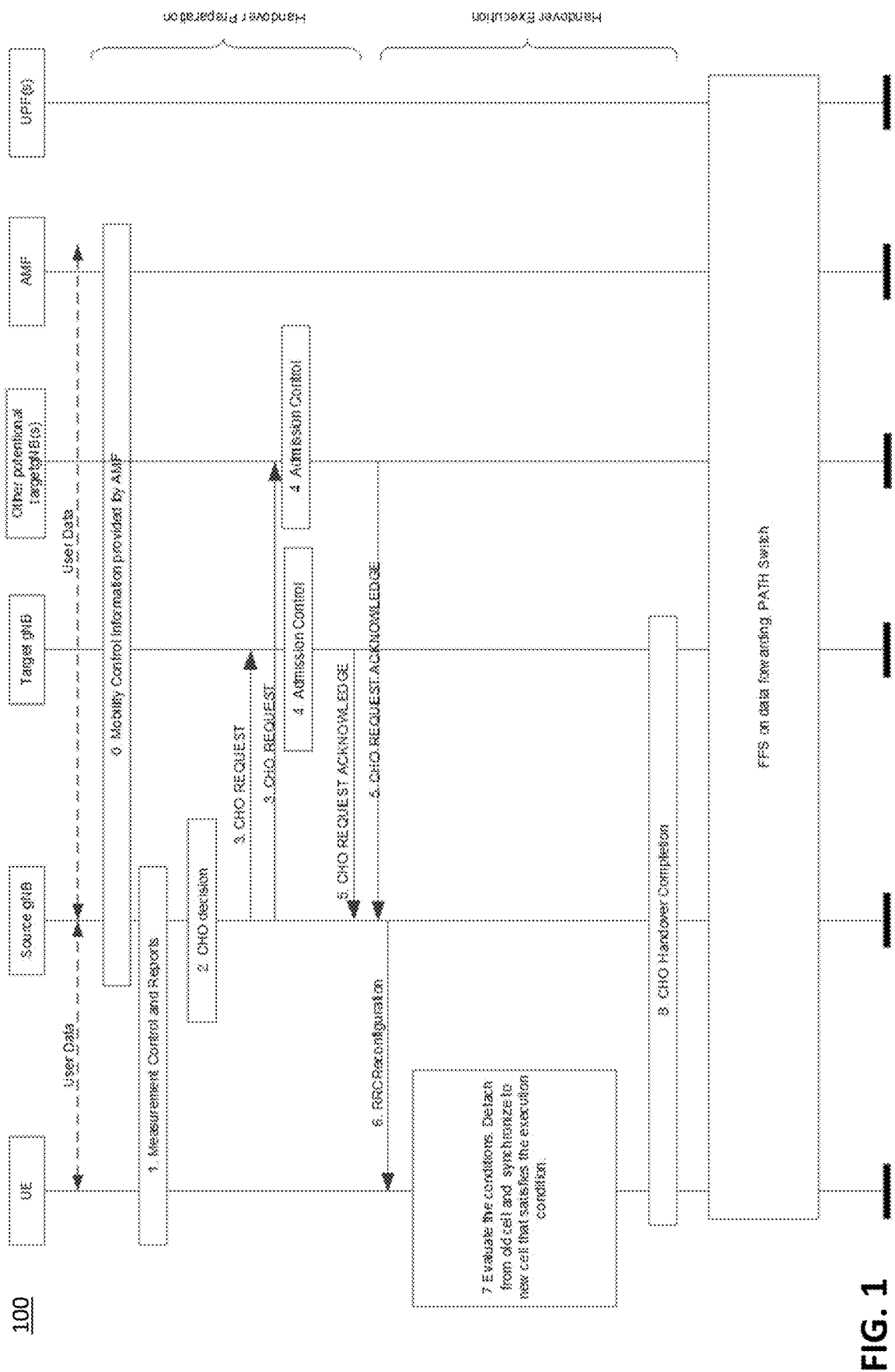
FIG. 1 shows an example of intra-AMF/UPF Conditional Handover.
Figure 2:
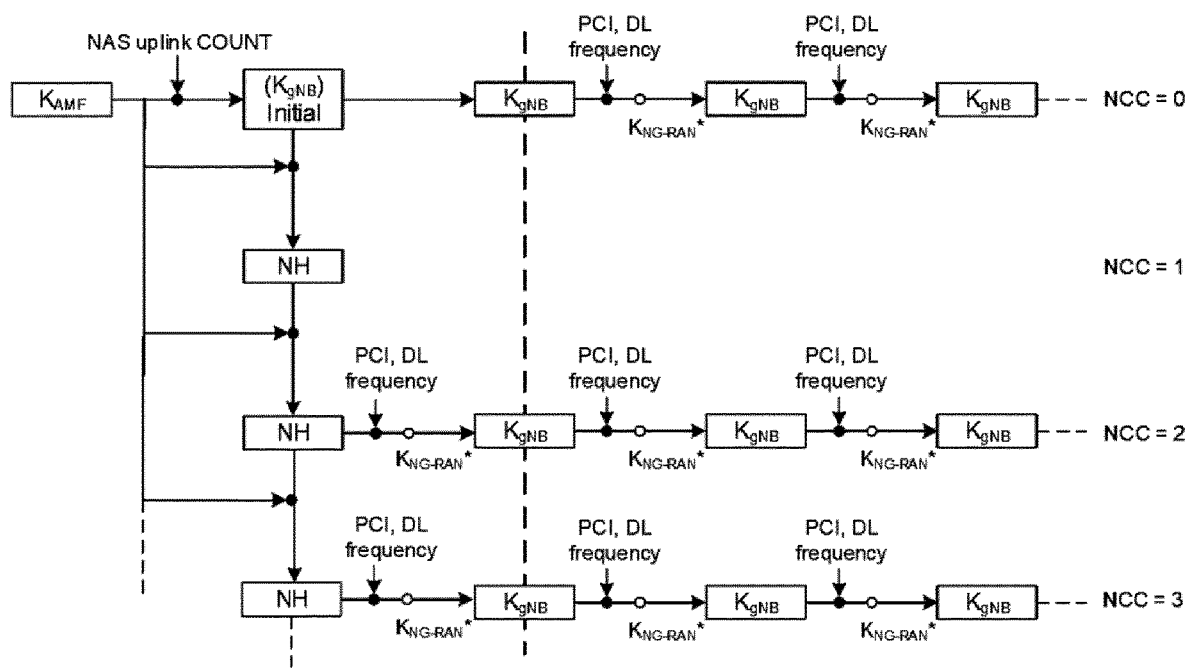
FIG. 2 shows an example of a model for handover key chaining.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

There currently exist certain challenge(s). For example, supporting conditional PSCell addition or conditional PSCell change could be an attractive solution of supporting heterogeneous networks consisting of relatively few powerful Macro base stations operating on a low frequency band below 6 GHz, which is augmented with a layer of smaller Micro/Pico base stations operating on a higher frequency band e.g. above 6 GHz. In such a solution a UE could stay constantly connected to the Macro layer (primary cell group) for coverage, basic service support, while it can, depending on local radio condition, connect to the Micro/Pico layer as a secondary cell group for data boost using the wider bandwidth associated with the higher frequency bands.

Since the coverage of the higher frequency bands could be very spotty, it could happen quite frequently that the UE moves in and out of coverage of the Micro/Pico cells, or that a neighbour Micro/Pico cell provides a better QoS. In order to reduce the burden on the network controlling UE mobility to instruct exactly when a UE should connect to a new Micro/Pico layer cell, it is beneficial to use the conditional PSCell change feature where the network only provides the UE with the conditions for moving to/from a PSCell, but where the actual evaluation and execution of the change is initiated by the UE.

For the same reasons, conditional PSCell addition (i.e. the network provides the UE with the conditions for adding a PSCell) would be beneficial when a UE moves to a new Macro cell with multiple higher frequency bands Micro/Pico cells under its coverage.

In 3GPP it has been agreed that conditional PSCell addition/change should be supported based on existing conditional handover procedures i.e. developed for primary cell group. The problem with this is that the security key handling is different for handover to primary cell group which typically involve changing the master key, from PSCell addition/change which typically involve changing secondary keys.

One difference in this respect is that the master key is based on calculations using the target cell parameters as input (e.g. cell ID), as such a unique master key is generated for every conditional handover candidate cell. This is however not the case for secondary cells using secondary keys which is only calculated using the master key and SK-Counter. So, it is not possible to reuse the existing mechanism as is in order to for instance prepare multiple secondary nodes which are associated with the same master key since that would violate the principle that the same key should not be available in multiple nodes.

Certain aspects of the present disclosure and their embodiments may provide solutions to these or other challenges. Examples of this disclosure provide methods in a master node to prepare multiple candidate secondary nodes (and associated cells) with separate security keys to ensure that there is no key re-use. Examples also include methods by a master node to provide the UE with separate sk-Counter values for each conditional configuration associated to a separate candidate secondary node. Examples also include methods by a master node to provide conditional secondary nodes with updated secondary keys upon execution of a conditional PSCell addition/change or upon change of master key. Examples also include methods by a UE to update the secondary key of a conditional PSCell configuration upon reception of a message from the master node. Examples also include methods by a master node to request a candidate master node to prepare multiple secondary keys to candidate secondary nodes associated to each candidate PCell. Some examples enable the security configuration for conditional PSCell addition/change. The master key derivation depends on the carrier frequency and physical cell ID of the PCell, whereas the secondary key derivation, only depends on the master key and a counter value (sk-Counter). Thus, it is possible to prepare multiple conditional PSCell configurations associated to the same candidate SN, using the same security key.

There are, proposed herein, various embodiments which address one or more of the issues disclosed herein. For example, an aspect of this disclosure provides a method performed by a wireless device for determining security keys. The method comprises, for each candidate primary secondary cell (PSCell) of a plurality of candidate PSCells for conditional addition or change by the wireless device for dual connectivity, receiving, from a network node, a respective value associated with the candidate PSCell, wherein the value associated with the candidate PSCell is different to the value associated with at least one other candidate PSCell. The method also comprises determining, for each of at least one candidate PSCell of the plurality of candidate PSCells, a respective security key for communications between the wireless device and the candidate PSCell, wherein the respective security key is determined based on a master key and the respective value associated with the candidate PSCell.

Another aspect of this disclosure provides a method performed by a network node for determining security keys. The method comprises determining, for each candidate primary secondary cell (PSCell) of a plurality of candidate PSCells for conditional addition or change by a wireless device for dual connectivity (DC), a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell. The method also comprises sending, for each candidate PSCell, the respective security key to a respective candidate secondary node associated with the candidate PSCell.

Certain embodiments may provide one or more of the following technical advantage(s). For example, examples of this disclosure may enable security key handling for conditional addition/change of one or multiple candidate PSCells (secondary cell groups), thus enabling the deployment scenario discussed in the problem description. Examples achieves this without security key reuse, e.g. using or storing the same security key in multiple network nodes. In this way existing security principles can be maintained while supporting this new solution.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the following examples, actions are performed by a master node (MN). However, this should be interpreted as being interchangeable with any suitable network node in some examples. Furthermore, where a sk-Counter value is specified for a node such as a secondary node (SN), or PSCell, in some examples this may also interpreted as being any suitable value other than a sk-Counter value. Similarly, where a key KgNB is specified, in some examples this may be interpreted as being any suitable master key. Where a User Equipment (UE) is specified, in some examples this may be interpreted as being any suitable wireless device.

A UE configured with a set of conditional RRCReconfiguration(s) may for example execute a handover when the condition for the handover is fulfilled (referred to herein in some examples as a conditional handover or CHO). In some examples, the UE would be configured with a set of configurations to be applied in the event of failure, e.g. handover, conditional handover, radio link, or reconfiguration failure. In both of these examples, the UE can be configured with a multitude of configurations (e.g. each relating to a CHO), each with their own set of conditions for when to apply the configurations (e.g. when to execute a conditional handover). In some examples, only one of the configurations may be applied at the time, but it is not detailed what the UE should do with the extraneous configurations after one of the conditional configurations have been applied.

In some examples, the UE would be instructed to either release or maintain un-executed configurations, and the network would release these in the candidate nodes In some examples, how to configure dependent conditional thresholds for a PCell and a PSCell may be considered, where for example the UE would only evaluate the condition for the PSCell if it fulfilled the condition for the PCell.

Under the assumption that upon the triggering of conditional handover the UE executes a handover like procedure towards a single cell triggering the condition, during this procedure the UE may still have stored configuration(s) as described above. These conditional handover related configuration(s) may be for:
- Cell(s) that have also triggered the condition for conditional handover, but were not selected to be the target cell e.g. due to some prioritization rule the UE applies;
- Cell(s) that have not triggered the condition for conditional handover, but for which the UE has stored a configuration;
- Measurement object(s)/frequencies that have also triggered the condition for conditional handover, but were not selected to be the target cell e.g. due to some prioritization rule the UE applies;
- Measurement object(s)/frequencies that have not triggered the condition for conditional handover, but that the UE has stored a configuration;
- Any other appropriate reason.

As described herein, the "conditional handover related configuration(s)" for a certain cell may comprise at least one of the following:
- An RRCReconfiguration message or similar message (or any message with equivalent content), possibly containing a reconfigurationWithSync using New Radio (NR) terminology (defined in 38.331 specifications); Or, using LTE terminology, an RRCConnectionReconfiguration with mobilityControlInfo in the LTE terminology (defined in 36.331 specifications); or the configuration related information in any of these messages;
- Triggering condition(s) configuration, e.g. similar or identical to A1-A6 triggering events (as defined in 38.331/36.331 in reportConfig) where instead of triggering a measurement report it would trigger a conditional handover;
- Other conditional handover controlling parameters e.g. timer defining the validity of target candidate resources, etc.

Examples disclosed herein may be focused on dual connectivity (DC) between two NR nodes (e.g. Dual Connectivity in NR, NR-DC). However, examples may be equally applicable to other scenarios (e.g. NR-DC, NE-DC, intra LTE-DC and (NG)EN-DC) also involving other RATs such as LTE/E-UTRAN, where for example the corresponding E-UTRA message would be applied. Examples disclosed herein relate to NR, KgNB and S-KgNB, and sk-Counters, though other examples, values and value types may be used in other examples.

Some examples relate to a method by a first network node operating as a master node to a wireless device (e.g. a User Equipment, UE) or a candidate master node to provide security keys to one or more second network node(s) which are candidates for conditional PSCell addition and/or change (e.g. conditional addition and/or conditional change).

In some examples, when a network node (referred to in this example as a master node, MN) decides to configure a UE with a conditional PSCell configuration (e.g. conditional addition and/or conditional change), e.g. based on measurements or expected data traffic, the MN will transmit a message to the candidate nodes (e.g. a conditional PSCell addition request). This message will comprise a secondary key, derived based on the current $K_{gNB}$(KgNB) and a sk-Counter value. If the MN decides to request a conditional PSCell addition from multiple candidate SNs, the MN will derive separate (e.g. different)S-KgNB for the different nodes (or PSCells) based on different sk-Counter values for each of the candidate secondary nodes (SNs) or for each candidate PSCell. In this way the MN can ensures that unique S-KgNBs are generated for each candidate SN (or PSCell). Thus in this example, and at least some other examples, each candidate PSCell is associated with a respective value that is for example a sk-Counter value for the PSCell.

If the MN requests multiple conditional PSCell addition for the same SN, i.e. if there are multiple candidate cells in the same SN, the master node can in some examples send one or more of:
- A single conditional PSCell addition request comprising a single S-KgNB derived from a single sk-Counter value, and the SN responds with multiple conditional PSCell addition response comprising configurations for the different candidate PSCells. A possible advantage of this solution is reduced signaling.
- Multiple conditional PSCell addition requests, each indicating which candidate PSCell it refers to. Each of these requests may contain an S-KgNB which is derived:
  - From a single sk-Counter value, i.e. all concurrent conditional PSCell addition requests to the same SN contain the same S-KgNB; or
  - From separate sk-Counter values, i.e. all concurrent conditional PSCell addition requests to the same SN contain different S-KgNBs.

The advantage with preparing multiple conditional PSCell addition requests is that although this slightly increases the signaling, it makes it possible in the implementation to treat each request separately and independently which typically is preferred from implementation point of view (e.g. it allows parallel execution). This also may have less specification impact. The advantage with using separate sk-Counters, even for PSCell addition requests within the same SN, is that it may be possible to hide the internal network topology from the UE since all conditional PSCell addition requests may in some examples appear the same for the UE (e.g. have the same format, and/or would indicate different sk-Counter or S-KgNB values) regardless of whether the cells belong to the same SN or different SNs.

If the MN requests concurrent conditional PSCell addition to multiple candidate SNs, the MN may ensure that the S-KgNB or S-KgNBs provided to different SNs are based on separate SK-Counter values.

In some examples, when the MN configures the UE with the conditional PSCell configurations, these configurations may each contain or identify a value such as for example an sk-Counter value (or at least some indication or information from which the sk-Counter value or S-KgNB can be determined). The MN may ensure that the respective value (e.g. sk-Counter value) for conditional PSCell configurations associated to different SNs (or different PCells) are different. However, if multiple conditional PSCell configurations are associated to the same SN, the MN can include or identify the same value in multiple conditional PSCell configurations. It is also possible in some examples to optimize the control message size to the UE by providing a list of cells that are all associated with the same SK-counter value (e.g. a list of cells with a list of sk-counter values).

In some examples, when the UE triggers the conditional PSCell addition/change, based on measurements fulfilling one or more trigger conditions, the UE derives the S-KgNB based on the sk-Counter value in the corresponding conditional PSCell configuration.

If the UE is provided with multiple conditional PSCell configurations associated to different SNs, the MN can in some examples reconfigure these configurations with an updated SK-Counter for example. The MN may also provide a new S-KgNB to the candidate SNs which didn't execute the conditional handover.

Alternatively, the MN may in some examples instruct the candidate SN(s) for conditional PSCell addition/change(s) that weren't executed to release the conditional PSCell configuration(s). The UE can then be instructed to discard the non-executed conditional PSCell configuration(s). Alternatively (or additionally), the UE may autonomously discard any non-executed conditional PSCell configuration when it executes one of them. The UE discarding behavior can be hard coded in the standards controlling the UE behavior or it can be configured by the network.

Alternatively, for example, if the UE is provided with multiple conditional PSCell configurations associated to the same SN, the UE may maintain these configuration(s) when it executes one of them. If each of the conditional PSCell configurations are provided with the same SK-Counter, the UE can keep the configurations as is (although if each configuration is provided with different SK-Counter values, in some examples the values must be updated or the configurations released).

In some examples, the source MN provides the UE with conditional handover configurations comprising configurations for both a candidate PCell and PSCell.

Since each candidate target MN can provide multiple cells, as well as connect to multiple SNs, the conditional configuration may in some examples account for this. It can even be so that a PSCell can be a candidate secondary cell for multiple primary PCells. In this case the PSCell can be associated with different or the same SK-counter values for the different PCells. It should be noted that it may be permissible to use the same SK-counter values for PSCell associated with the same SN, or for PSCells associated with different SNs and different PCells since the secondary key is derived both from the SK-counter and the master key which is different for different PCells.

In some examples, the MN may request a conditional handover to one candidate cell in one target node. The target node can then request neighbouring candidate SNs for conditional PSCell addition requests, where the candidate target MN provides S-KgNBs for each candidate SN based on the KgNB associated with the candidate PCell.

If the source MN requests conditional configurations for multiple cells in the candidate target node, the candidate target node can in some examples separate request conditional PSCell addition request from candidate SNs with S-KgNBs derived separately from KgNBs associated to each candidate PCell.

Thus, for example, if the source MN requests a conditional handover with SN addition from a single candidate target node comprising of 3 cells with two neighbouring candidate SNs, each comprising of 3 cells, there may be:

3 conditional KgNB, with 2 conditional S-KgNBs associated to each conditional KgNB (i.e. 6 conditional S-KgNBs) if the same S-KgNB is used for all candidate PSCells in the same SN; or
  3 conditional KgNBs with 6 conditional S-KgNBs associated to each conditional KgNB (i.e. 18 conditional S-KgNBs) if the separate S-KgNB is used for each candidate PSCells in the same SN.

If in some examples the source MN requests conditional MN configurations with conditional PSCell configurations from multiple candidate nodes, the number of conditional S-KgNBs will grow accordingly.

Figure 3:
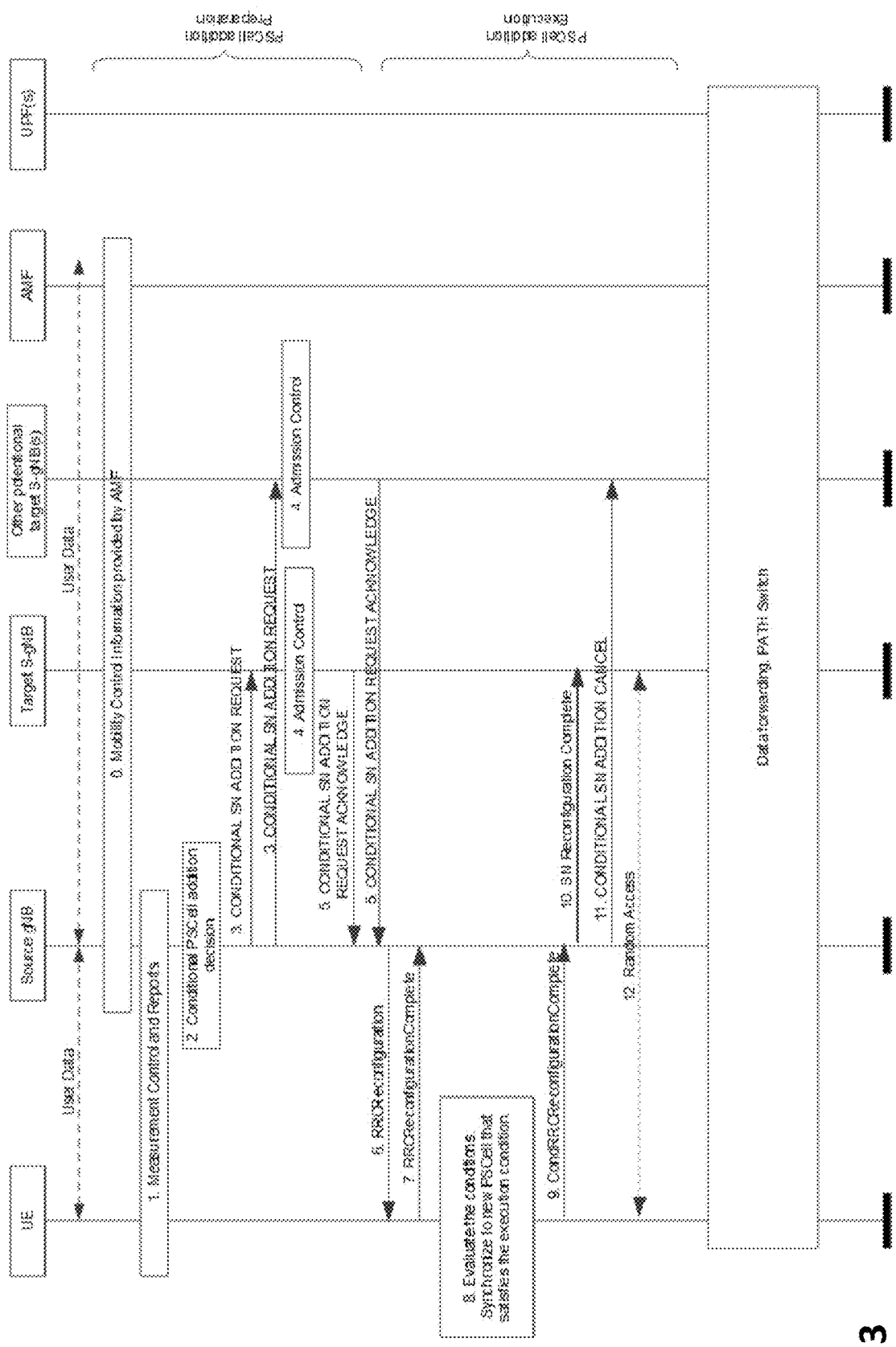
FIG. 3 shows an example of communications in a network for methods according to examples of this disclosure.

FIG. 3 shows an example of communications 300 in a network for methods according to examples of this disclosure. For example, FIG. 3 shows an example of conditional PSCell addition. In this example shown in FIG. 3, the following steps occur:
  1. UE reports measurement results of neighboring cells
  2. Source gNB decides to configure conditional PSCells in multiple neighboring nodes, either based on measurements (from step 1) or blindly configuring it.
  3. Source gNB sends request to candidate S-gNBs requesting to setup a conditional SN. The request contain the S-KgNB based on unique sk-Counters per candidate SN
  4. Candidate S-gNBs perform admission control
  5. Each candidate SN, which accept the UE responds with an acknowledgement containing the conditional PSCell configurations
  6. Source gNB decides triggering conditions for each conditional PSCell addition and provide the UE with the conditional configurations
  7. UE acknowledges the reception of the conditional configurations
  8. UE fulfills at least one of the conditional triggers, if multiple conditions are fulfilled, relative priorities are applied and only one conditional configurations is triggered
  9. UE transmits an RRC message (e.g. CondRRCReconfigurationComplete) to the MgNB indicating which conditional configuration was triggered
  10. MgNB sends a complete message to the selected candidate SN, indicating which cell was selected
  11. MgNB sends a message to other candidate nodes indicating that they were not executed, allowing them to release the resources. This message can be a new message or an existing message (e.g. SgNB Reconfiguration Complete with failure)
  12. UE performs Random access to the selected PSCell. The UE may perform the random access prior to transmitting the CondRRCReconfigurationComplete message (in step 9).

Figure 4:
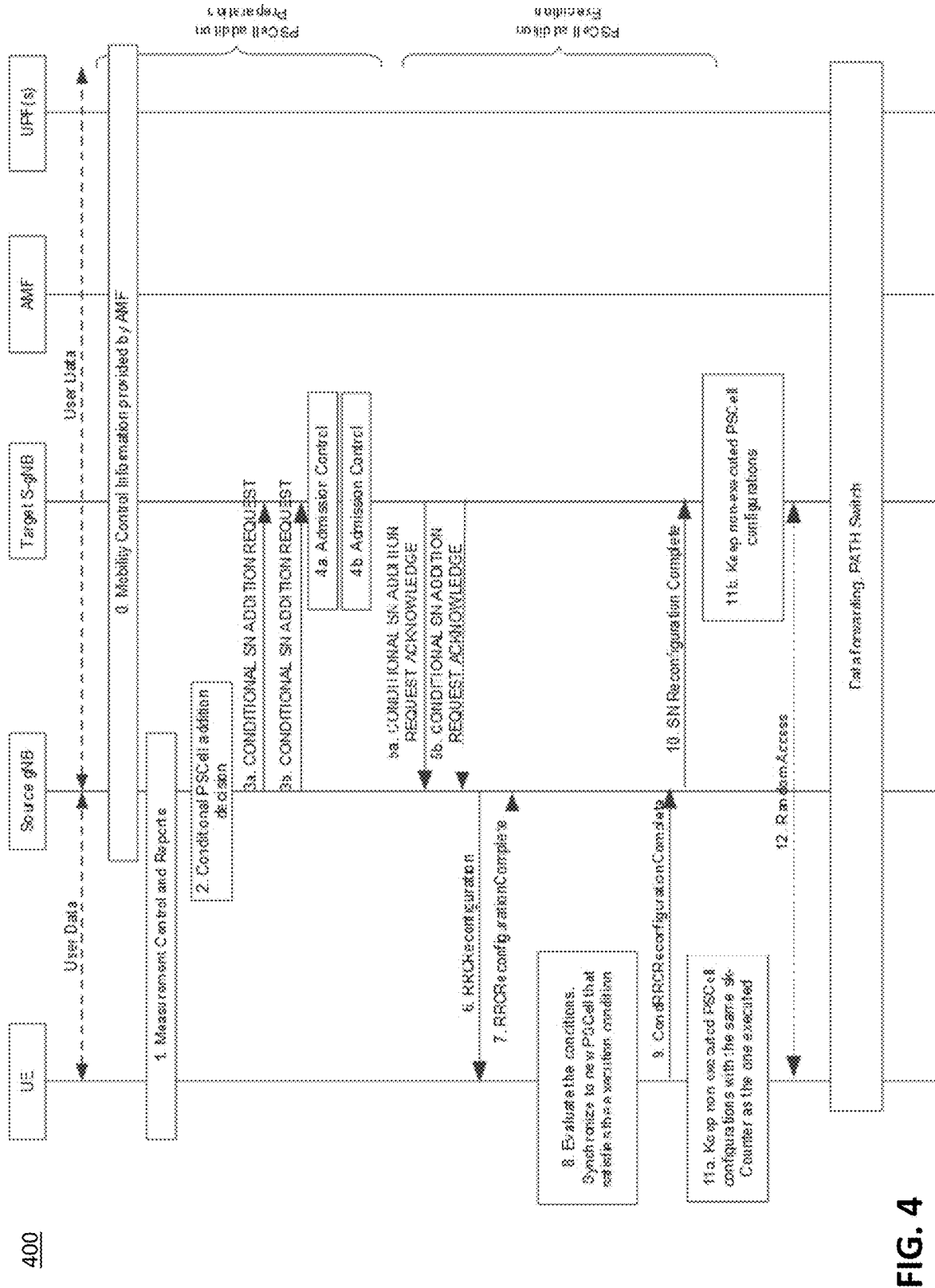
FIG. 4 shows another example of communications in a network for methods according to examples of this disclosure.

FIG. 4 shows an example of communications 400 in a network for methods according to examples of this disclosure. For example, FIG. 4 shows an example of multiple PSCell additions. In the example shown in FIG. 4, the following steps occur:
  1. UE reports measurement results of neighboring cells
  2. Source gNB decides to configure multiple conditional PSCells in a single neighboring node, either based on measurements (from step 1) or blindly configuring it.
  3. Source gNB sends multiple request to the candidate S-gNB requesting to setup a conditional SN each message indicate a particular candidate PSCell. The requests contain the same S-KgNB based on a single sk-Counter value
  4. The candidate S-gNB perform access control, either a single procedure per UE, or one per request
  5. If the candidate SN accept the UE responds with one acknowledgement per PSCell addition request containing the conditional PSCell configurations, the message can contain preferred trigger conditions for the different PSCells
  6. Source gNB decides triggering conditions for each conditional PSCell addition and provide the UE with the conditional configurations
  7. UE acknowledges the reception of the conditional configurations 8. UE fulfills at least one of the conditional triggers, if multiple conditions are fulfilled, relative priorities are applied and only one conditional configuration is triggered 9. UE transmits a CondRRCReconfigurationComplete message to the MgNB indicating which conditional configuration was triggered 10. MgNB sends a complete message to the selected candidate SN, indicating which cell was selected, 11. The UE and the candidate SN keep the non-executed PSCell configurations since these use the same key as the one executed 12. UE performs Random access to the selected PSCell. The UE may perform the random access prior to transmitting the CondRRCReconfigurationComplete message (in step 9).

The procedures in FIGS. 3 and 4 can be combined in some examples, where the source node requests multiple conditional PSCells from multiple candidate SNs.

Figure 5:
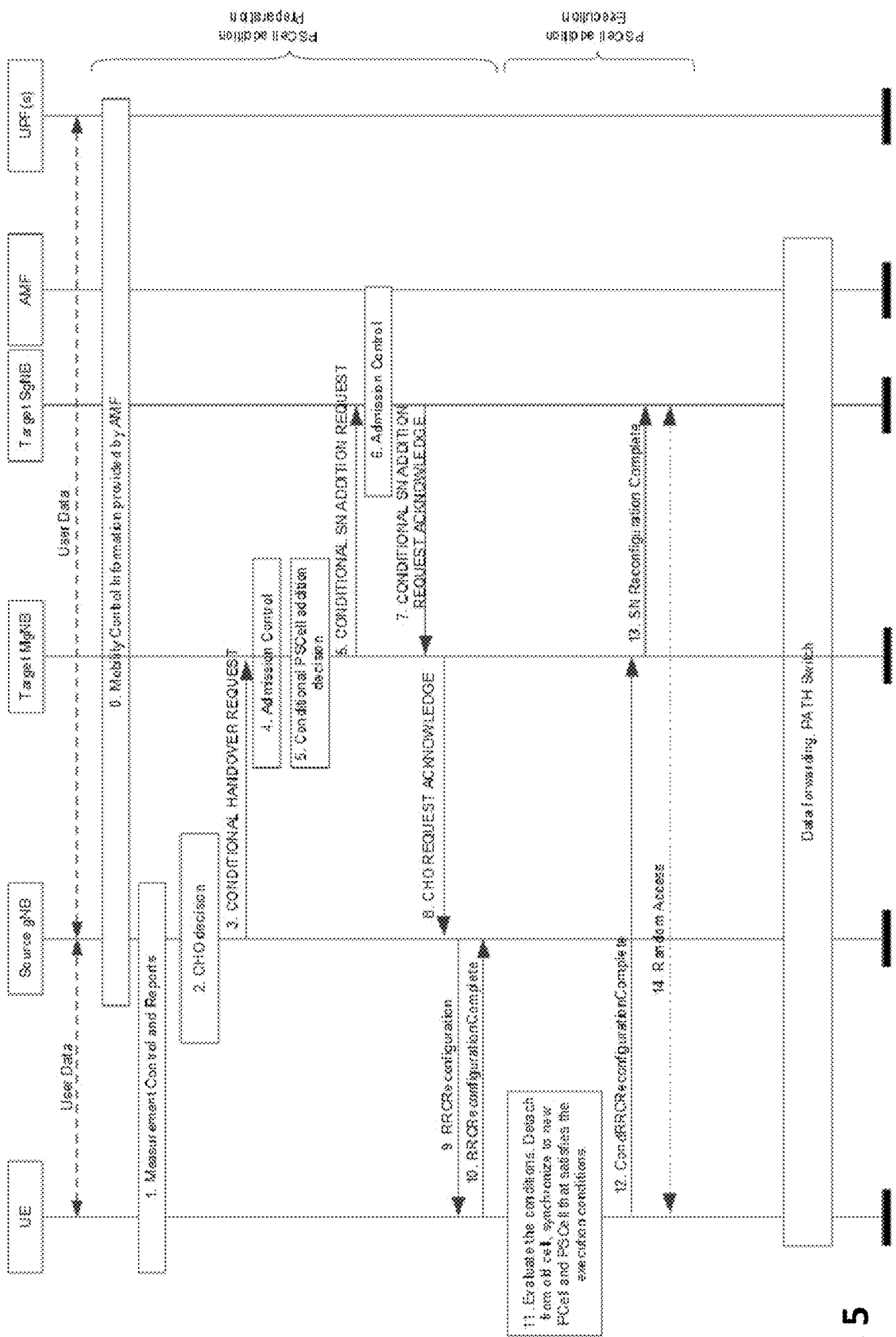
FIG. 5 shows another example of communications in a network for methods according to examples of this disclosure.

FIG. 5 shows an example of communications 500 in a network for methods according to examples of this disclosure. For example, FIG. 5 shows an example of configuring a conditional PSCell addition in combination with a conditional handover. In the example shown in FIG. 5, the following steps occur:

0. The UE context within the source gNB contains information regarding roaming and access restrictions which were provided either at connection establishment or at the last TA update.

1. The source gNB configures the UE measurement procedures which may assist the decision of CHO candidate cell(s) and the UE reports according to the measurement configuration.

2. The source gNB makes decision on the usage of CHO to handover the UE, based on MeasurementReport and RRM information.

3. The source gNB issues a CHO Request message to one or more candidate gNBs. Request message may contain e.g. measurementReport.

4. Admission Control may be performed by the candidate gNB

5. Candidate gNB decides to add conditional PSCeII in neighbouring node and sends a Conditional SN addition request containing a S-KgNB based on the KgNB associated to the candidate PCell 6. Admission Control may be performed by the candidate SgNB 7. The candidate sends Conditional AN addition response to the candidate gNB 8. The candidate decides the conditional triggers for the candidate PSCeII and sends CHO response to the source gNB containing both the Conditional PSCeII configurations, and the conditional PCell configurations 9. The source gNB sends a RRC message with CHO configuration and the conditional SN addition to the UE. The configuration of multiple CHO candidate cells generated by candidate gNB(s) can be signalled to the UE via one or more RRC messages 10. The UE acknowledges the reception of the CHO configuration 11. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies corresponding configuration for that candidate cell and synchronises to that candidate cell. When the UE has executed the CHO for a particular PCeII, it can evaluate whether any of the associated PSCells trigger the Conditional PSCeII addition 12. The UE synchronises to the candidate cell and completes the RRC handover procedure by sending CondRRCReconfigurationComplete message to candidate gNB. This message also includes the conditional PSCeII addition complete message 13. The candidate gNB forwards the SN Reconfiguration Complete message to the candidate SN 14. The UE synchronizes with the candidate PSCeII If the UE was configured with multiple conditional PCells in the candidate MeNB, in some examples each of these may be configured with a separate key. Each of these cells could in some examples be configured with multiple conditional PSCeII configurations in one or more candidate SNs. For each candidate PCeII, each candidate SN may in some examples require a separate key based on the key of the candidate PCeII (e.g. a master key associated with the candidate PCeII) and an sk-Counter (e.g. a respective further value for the candidate SN).

In some examples, the conditional configurations for the PCell and the PSCeII are provided as an embedded RRCReconfiguration messages inside another RRCReconfiguration message, alongside any trigger conditions e.g.:

```
RRCReconfiguration-v1560-IEs :: =         SEQUENCE {
    mrdc-SecondaryCellGroupConfig                 SetupRelease { MRDC-
SecondaryCellGroupConfig }            OPTIONAL,  -- Need M
    radioBearerConfig2                            OCTET STRING (CONTAINING
RadioBearerConfig)                    OPTIONAL,  -- Need M
    sk-Counter                                    SK-Counter
OPTIONAL,  -- Need N
    nonCriticalExtension                          RRCReconfiguration-v16xx-IEs
OPTIONAL
}
RRCReconfiguration-v16xx-IEs ::=          SEQUENCE {
    conditionalConfigurationList                                  SEQUENCE
{1..maxConditionalConfigurations} OF ConditionalConfiguration    OPTIONAL,  -- Need
N
    conditionalConfigurationList2                                 SEQUENCE
{1..maxConditionalConfigurations} OF ConditionalConfiguration    OPTIONAL,  --
Need N
    nonCriticalExtension                                          SEQUENCE { }
OPTIONAL
}
ConditionalConfiguration :: =  SEQUENCE {
triggerCondition                       conditionConfig,
conditionalRRCReconfiguration          OCTET STRING (CONTAINING RRCReconfiguration)
}
```

For example, the conditionalConfigurationList could be used to configure conditional PCells for CHO, while the conditionalConfigurationList2 could be used to configure conditional PSCells.

If the top level RRCReconfiguration message contained multiple conditionalConfigurationList:s, these may be for different configurations, e.g. different candidate gNBs, different candidate PCells in the same gNB or different conditional configurations for the same PCell.

If the conditionalConfigurationList2 were included in the top level RRCReconfiguration, the PSCells may be considered as PSCells for the serving PCell, i.e. the sk-Counter included would be associated with the current KgNB.

However, if the conditionalConfigurationList2 is embedded in a configuration for a conditionalConfiguration in the conditionalConfigurationList, the PSCell may be considered as a PSCell for the corresponding candidate PCell.

In some examples, the UE is allowed to maintain un-executed conditional PSCell configurations, which are associated to the same PCell.

If the UE executes a combined conditional handover and conditional PSCell addition, the UE may for example release all un-executed CHO configurations, and the un-executed PSCell configurations associated to the un-executed PCell configuration. However, for the un-executed PSCell configuration of the executed PCell configurations, the UE may check all configurations, and maintain the configurations which contained the same sk-Counter value. Those PSCell configurations associated to the executed PCell (or serving PCell if the UE only perform a conditional PSCell addition), which contained a different sk-Counter value, may be released.

Thus in order to avoid having the UE parse all un-executed PSCell configurations (associated to the same PCell) to determine which have the same sk-counter value, the conditional PSCell configurations could in some examples be signaled in a group for each candidate SN in some examples. This could be implemented as, for example:

candidate PSCell, the UE may release all un-executed conditional PCell configurations, all un-executed conditional PSCell configurations, except the conditional PSCell configurations in the executed ConditionalSN-Configuration.

For Conditional PSCell change, the UE may be currently configured with a PSCell with a key derived from the current KgNB and the current value of the sk-Counter for example. When the network configures the conditional PSCells, it may ensure that the sk-Counter value is never reused as long as the KgNB remain the same.

Thus, if the network provide the UE with multiple conditional PSCell configurations, each of them may have a unique sk-Counter value unless the conditional PSCell configurations are associated to the same SN.

In some examples, if the UE executes a conditional PSCell addition in one candidate SN (i.e. uses the associated sk-Counter to calculate the S-KgNB), the UE maintains the other conditional PSCell configurations with different sk-Counter values, and the network ensures that the provided sk-Counter values are never reused without changing the KgNB.

Similar issues as described above may arise in some examples when a UE is configured with conditional PSCell addition in RRC_INACTIVE. When a UE is suspended to RRC_INACTIVE, it receives a parameter (NCC) used to derive a security key for the master key (KgNB) in the cell where the UE resumes. The UE may in some examples be allowed to receive multiple conditional PSCell configurations in RRCRelease and the UE would activate one of the configurations when it resumes.

The problem is that in order to ensure security, the NW may in some examples have to provide separate sk-Counters at least for configurations associated to one SN, i.e. if the UE receives conditional PSCell configurations for cells in separate SNs these would have to have separate sk-counter. If the

```
RRCReconfiguration-v16xx-IEs ::=         SEQUENCE {
    conditionalConfigurationList                         SEQUENCE
{1..maxConditionalConfigurations } OF ConditionalConfiguration       OPTIONAL,   -- Need
N
    conditionalSN-ConfigurationList                      SEQUENCE  {1..maxSN-
ConditionalConfigurations} OF ConditionalConfiguration   OPTIONAL,    -- Need N
    nonCriticalExtension                                 SEQUENCE { }
OPTIONAL
}
ConditionalSN-Configuration :: =   SEQUENCE {
    sn-GroupIndex                        INTEGER {1..maxCondSN-Conf}
    conditionalConfigurationList         SEQUENCE {1..maxConditionalConfigurations}
OF Conditionalconfiguration       OPTIONAL,   -- Need N
}
ConditionalConfiguration :: =    SEQUENCE {
triggerCondition                 conditionConfig,
conditionalRRCReconfiguration    OCTET STRING (CONTAINING RRCreconfiguration)
}
```

In this example, the RRCReconfiguration message contains two lists: conditionalConfigurationList and conditionalSN-ConfigurationList. The conditionalSN-Configuration-List contains an SN index and all configurations for candidate PSCells in that SN.

If the UE is configured with multiple conditional PSCell configurations in one SN, in some examples, for several candidate PCells, each conditional PCell configuration can contain a conditionalSN-ConfigurationList. When the UE executes the conditional handover to one of the candidate PCells and executes the conditional PCSell addition for a conditional PSCell should be prepared for the UE, the MN would have to provide it with the S-KgNB in advance. However, since the network doesn't know which cell the UE will resume in, it cannot know which KgNB it should base the derivation of the S-KgNB on.

In some examples, the UE may only apply the conditional PSCell configuration if the UE resumes in the same cell as the UE was suspended in. In that case, the network only has to prepare the SNs with S-KgNBs based on one possible KgNB.

In some examples, the network (NW) prepares the SNs with the KgNBs upon reception of the RRCResumeRequest. In this case, the NW already knows which KgNB the UE will use.

In some examples, the MN prepares all candidate SNs with multiple S-KgNBs based on all possible KgNBs, i.e. regardless of where the UE resumes, the candidate has already received an S-KgNB for that node.

In some examples, the MN sends a message to the SN to indicate that the UE has selected a candidate PSCell in that node, this message containing the S-KgNB to be used.

Figure 6:
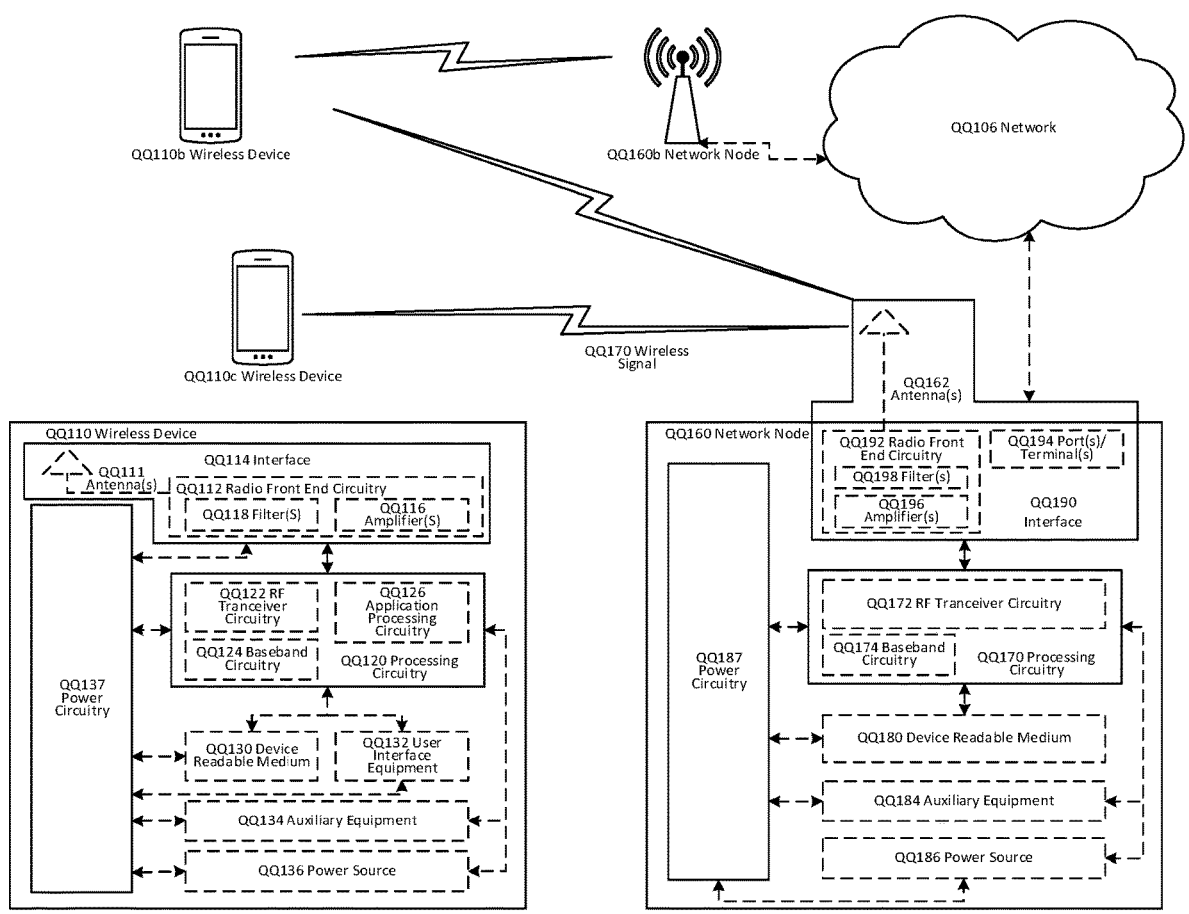
FIG. 6 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment.

Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 6 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120.

In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 7:
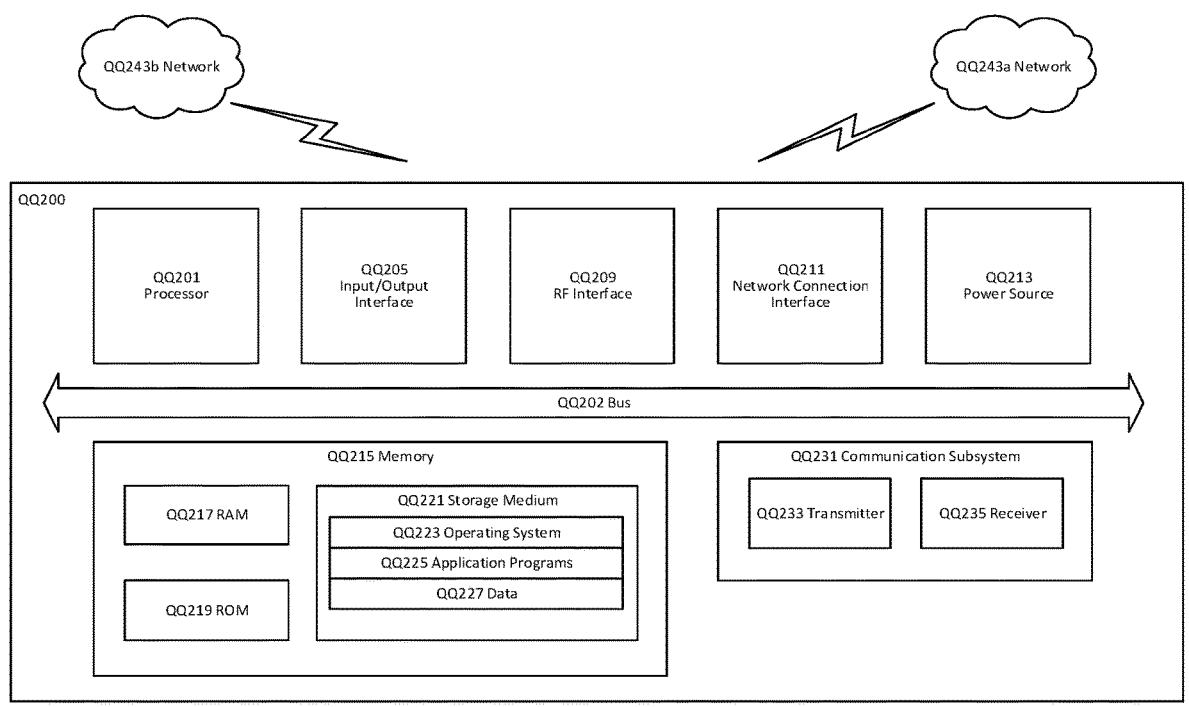
FIG. 7 shows an example of a User Equipment in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 7, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface QQ209 may be configured to provide a communication interface to RF components such as a transmitter, a receiver, and an antenna. Network connection interface QQ211 may be configured to provide a communication interface to network QQ243$a$. Network QQ243$a$ may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 7, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 8:
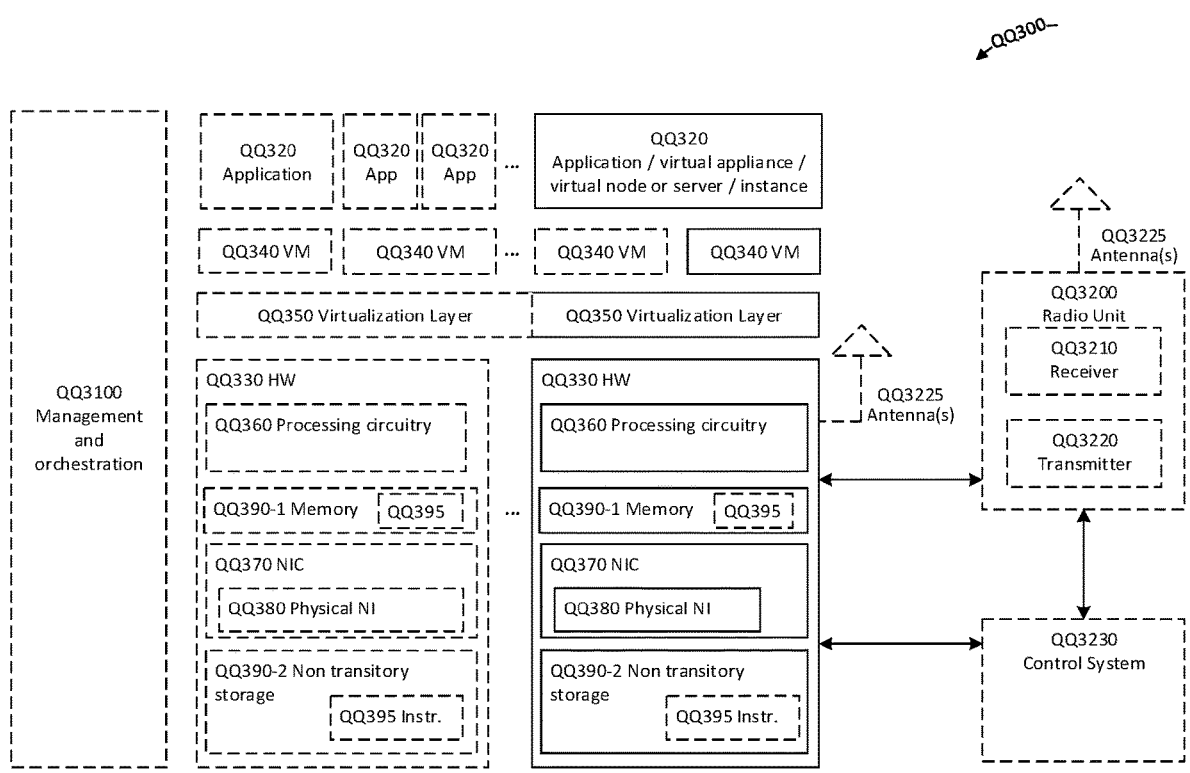
FIG. 8 shows an example of a virtualization environment in accordance with some embodiments.

FIG. 8 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 8, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 8.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 9:
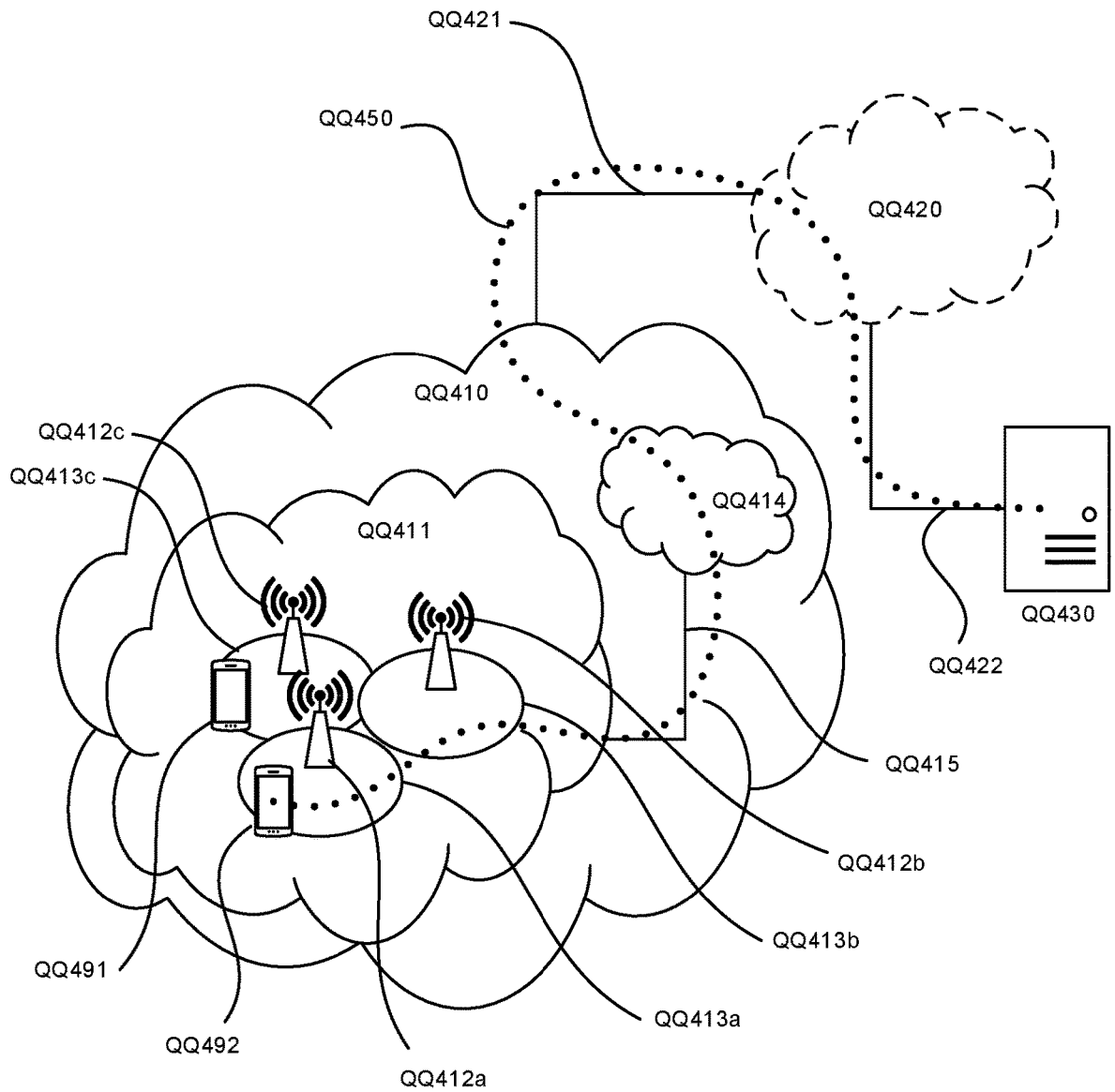
FIG. 9 shows an example of a telecommunication network connected via an intermediate network to a host computer in accordance with some embodiments.

With reference to FIG. 9, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a.

While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 9 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 10. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 10) served by base station QQ520. Communication interface QQ526 may be configured to facilitate connection QQ560 to host computer QQ510. Connection QQ560 may be direct or it may pass through a core network (not shown in FIG. 10) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 10:
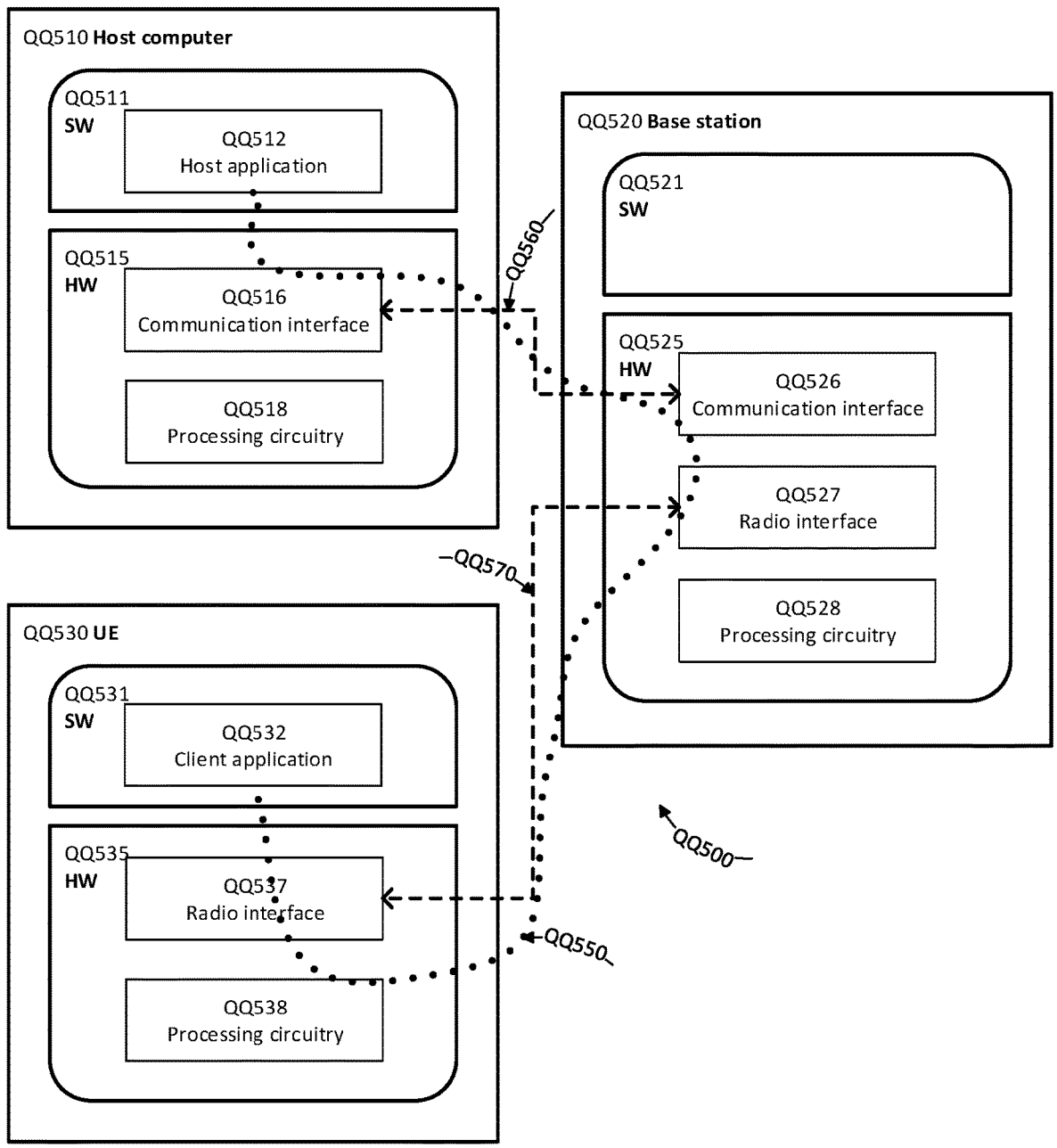
FIG. 10 shows an example of a host computer communicating via a base station with a user equipment over a partially wireless connection in accordance with some embodiments.

It is noted that host computer QQ510, base station QQ520 and UE QQ530 illustrated in FIG. 10 may be similar or identical to host computer QQ430, one of base stations QQ412*a*, QQ412*b*, QQ412*c* and one of UEs QQ491, QQ492 of FIG. 9, respectively. This is to say, the inner workings of these entities may be as shown in FIG. 10 and independently, the surrounding network topology may be that of FIG. 9.

In FIG. 10, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the handover process and thereby provide benefits such as improved service continuity.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 11:
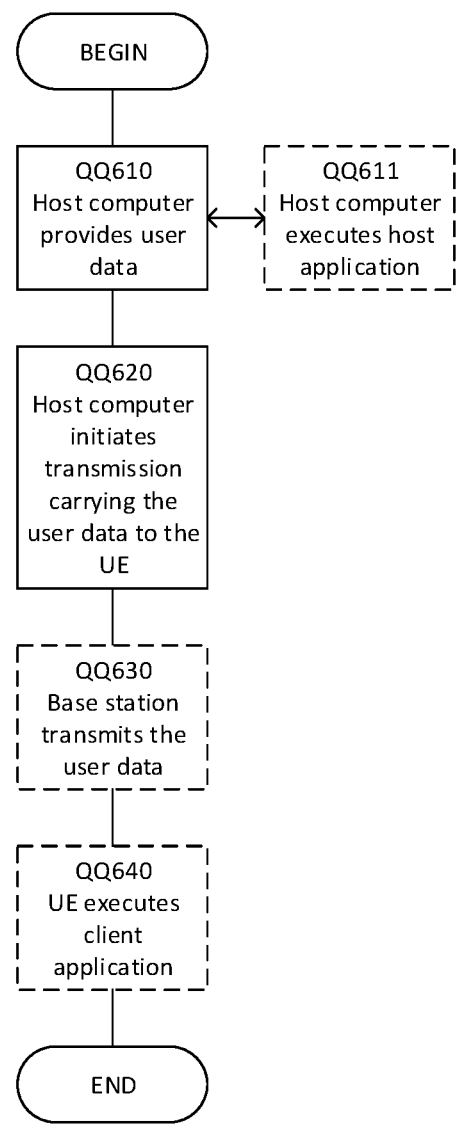
FIG. 11 shows examples of methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 12:
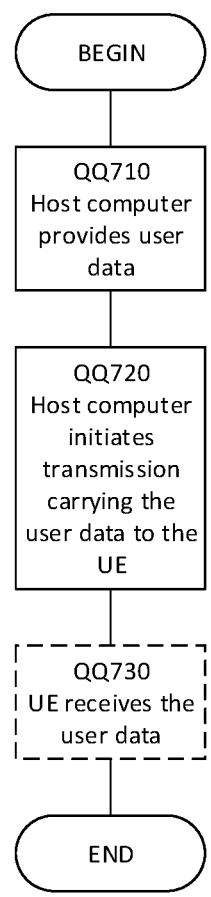
FIG. 12 shows examples of methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 13:
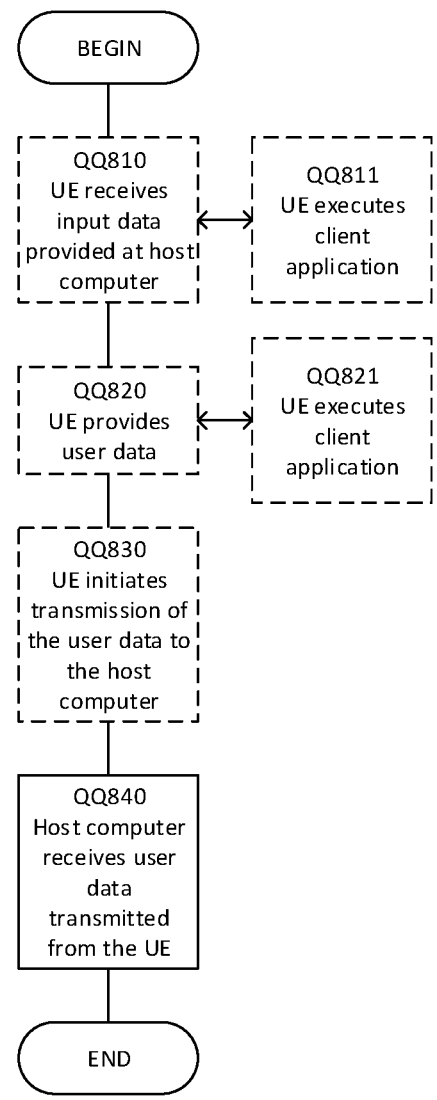
FIG. 13 shows examples of methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 14:
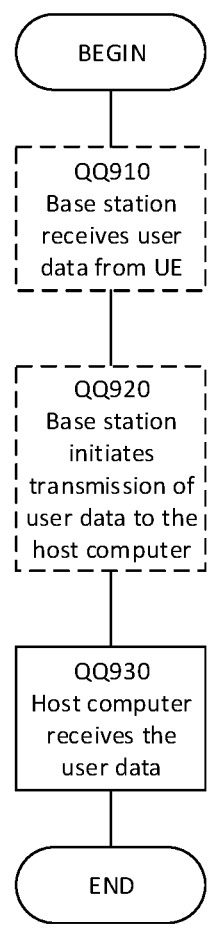
FIG. 14 shows examples of methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 15:
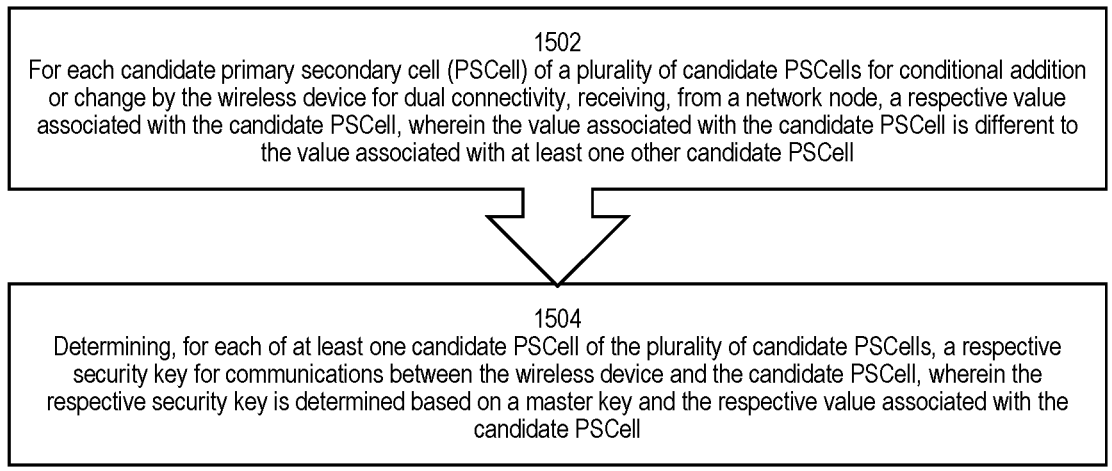
FIG. 15 depicts a method in accordance with particular embodiments.

FIG. 15 depicts a method in accordance with particular embodiments, the method begins at step 1502 with, for each candidate primary secondary cell (PSCell) of a plurality of candidate PSCells for conditional addition or change by the wireless device for dual connectivity, receiving, from a network node, a respective value associated with the candidate PSCell, wherein the value associated with the candidate PSCell is different to the value associated with at least one other candidate PSCell. Next, the method continues to step 1504 with determining, for each of at least one candidate PSCell of the plurality of candidate PSCells, a respective security key for communications between the wireless device and the candidate PSCell, wherein the respective security key is determined based on a master key and the respective value associated with the candidate PSCell.

Figure 16:
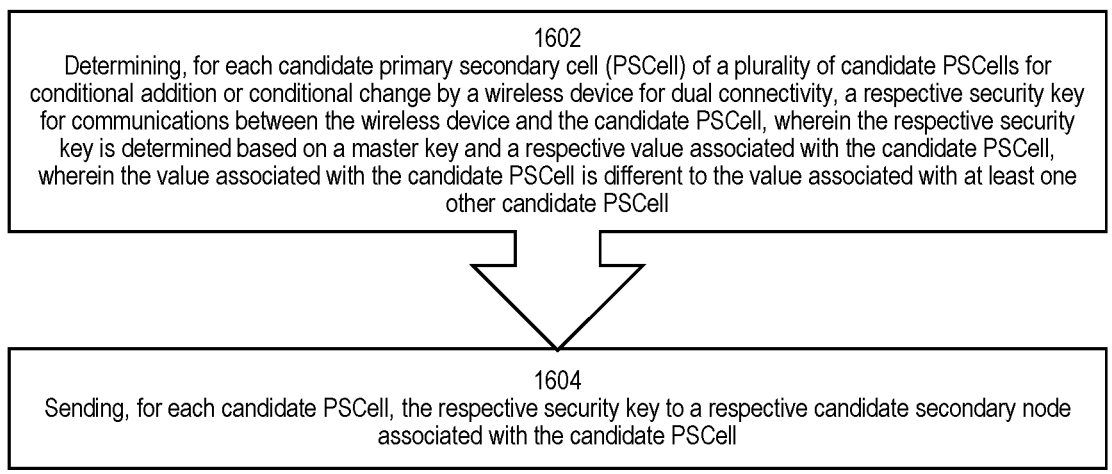
FIG. 16 depicts another method in accordance with particular embodiments.

FIG. 16 depicts a method in accordance with particular embodiments, the method begins at step 1602 with determining, for each candidate primary secondary cell (PSCell) of a plurality of candidate PSCells for conditional addition or conditional change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell. Next, the method continues to step 1604 with sending, for each candidate PSCell, the respective security key to a respective candidate secondary node associated with the candidate PSCell.

Figure 17:
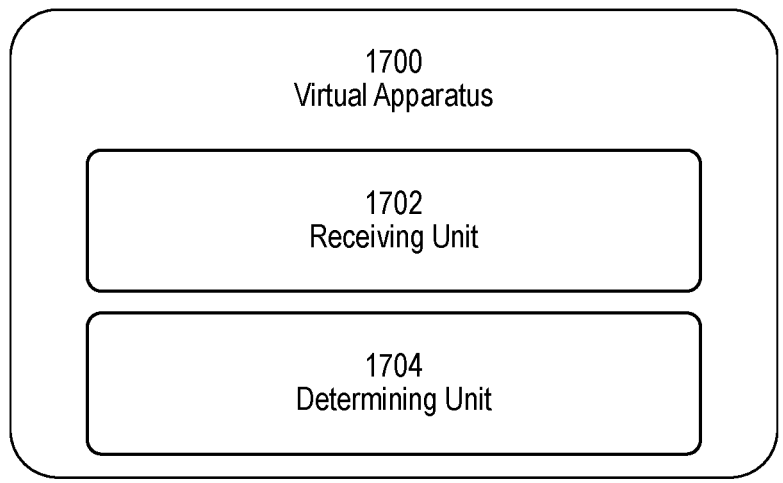
FIG. 17 shows an example of virtualization apparatus in accordance with some embodiments.

FIG. 17 illustrates a schematic block diagram of an apparatus 1700 in a wireless network (for example, the wireless network shown in FIG. 6). The apparatus may be implemented in a wireless device or network node (e.g., wireless device QQ110 or network node QQ160 shown in FIG. 6). Apparatus 1700 is operable to carry out the example method described with reference to FIG. 15 and possibly any other processes or methods disclosed herein. It is also to be understood that the method of FIG. 15 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702, determining unit 1704, and any other suitable units of apparatus 1700 to perform corresponding functions according one or more embodiments of the present disclosure.

As illustrated in FIG. 17, apparatus 1700 includes receiving unit 1702 that is configured to, for each candidate primary secondary cell (PSCell) of a plurality of candidate PSCells for conditional addition or change by the wireless device for dual connectivity, receive, from a network node, a respective value associated with the candidate PSCell, wherein the value associated with the candidate PSCell is different to the value associated with at least one other candidate PSCell. Apparatus 1700 also includes determining unit 1704 that is configured to determine, for each of at least one candidate PSCell of the plurality of candidate PSCells, a respective security key for communications between the wireless device and the candidate PSCell, wherein the respective security key is determined based on a master key and the respective value associated with the candidate PSCell.

Figure 18:
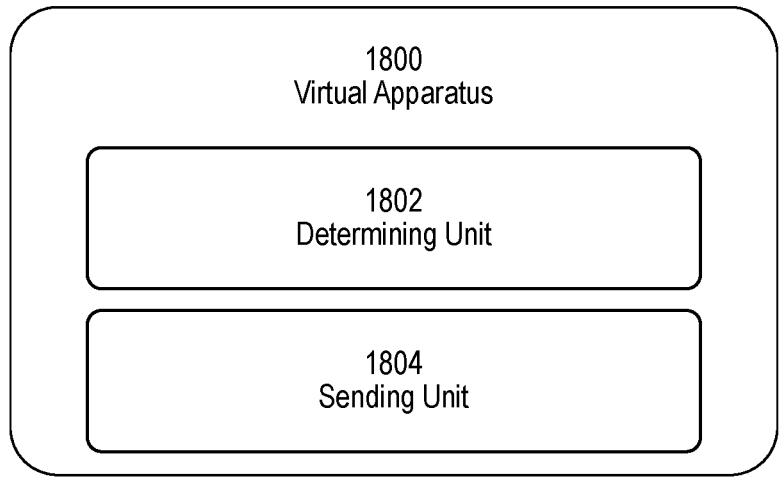
FIG. 18 shows another example of virtualization apparatus in accordance with some embodiments.

FIG. 18 illustrates a schematic block diagram of an apparatus 1800 in a wireless network (for example, the wireless network shown in FIG. 6). The apparatus may be implemented in a wireless device or network node (e.g., wireless device QQ110 or network node QQ160 shown in FIG. 6). Apparatus 1800 is operable to carry out the example method described with reference to FIG. 16 and possibly any other processes or methods disclosed herein. It is also to be understood that the method of FIG. 16 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1802, sending unit 1804, and any other suitable units of apparatus 1800 to perform corresponding functions according one or more embodiments of the present disclosure.

As illustrated in FIG. 18, apparatus 1800 includes determining unit 1802 that is configured to determine, for each candidate primary secondary cell (PSCell) of a plurality of candidate PSCells for conditional addition or conditional change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell. Apparatus 1800 also includes sending unit 1804 that is configured to send, for each candidate PSCell, the respective security key to a respective candidate secondary node associated with the candidate PSCell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following enumerated embodiments are included in the present disclosure.

Group A Embodiments

1. A method performed by a wireless device for determining security keys, the method comprising:
    for each candidate primary secondary cell (PSCell) of a plurality of candidate PSCells for conditional addition or change by the wireless device for dual connectivity, receiving, from a network node, a respective value associated with the candidate PSCell, wherein the value associated with the candidate PSCell is different to the value associated with at least one other candidate PSCell; and
    determining, for each of at least one candidate PSCell of the plurality of candidate PSCells, a respective security key for communications between the wireless device and the candidate PSCell, wherein the respective security key is determined based on a master key and the respective value associated with the candidate PSCell.
2. The method of embodiment 1, comprising receiving the values associated with the candidate PSCells and/or the master key from a network node or base station.
3. The method of embodiment 1 or 2, comprising determining that the condition associated with a first candidate PSCell of the candidate PSCells is fulfilled.
4. The method of embodiment 3, wherein determining, for each of at least one candidate PSCell of the plurality of candidate PSCells, a respective security key for communications between the wireless device and the candidate PSCell comprises determining the security key for communications between the wireless device and the first candidate PSCell.
5. The method of embodiment 3 or 4, comprising configuring the wireless device to use the first candidate PSCell as a PSCell.
6. The method of any of embodiments 1 to 5, wherein the candidate PSCells include two or more PSCells associated with a same candidate secondary node or base station, and the two or more PSCells are associated with the same value.
7. The method of any of embodiments 1 to 5, wherein the candidate PSCells include two or more PSCells associated with a same candidate secondary node or base station, and the two or more PSCells are associated with different values.
8. The method of any of embodiments 1 to 7, comprising receiving, from the network node, one or more configurations for configuring the wireless device with the plurality of candidate PSCells, wherein the one or more configurations indicate the values associated with the candidate PSCells.
9. The method of any of embodiments 1 to 8, wherein the values associated with the candidate PSCells are associated with a first primary cell for the wireless device, and the method comprises:
for each candidate PSCell, receiving, from the network node, a respective further value associated with the candidate PSCell, wherein the further value associated with the candidate PSCell is different to the value associated with the candidate PSCell and is different to the further value associated with at least one other candidate PSCell, and wherein the further values associated with the candidate PSCells are associated with a second primary cell for the wireless device.
10. The method of embodiment 9, comprising performing a RRC resume procedure to resume in the first primary cell, and wherein determining, for each of the at least one candidate PSCell of the plurality of candidate PSCells, the respective security key for communications between the wireless device and the candidate PSCell comprises determining the security key for communications between the wireless device and a first candidate PSCell of the candidate PSCells based on based on the master key and the value associated with the candidate PSCell and the first primary cell.
11. The method of any of embodiments 1 to 8, comprising performing a RRC resume procedure to resume in a first primary cell, and wherein receiving the values associated with the candidate PSCells is performed after a start of the RRC resume procedure.
12. The method of any of any of embodiments 1 to 8, comprising performing an RRC suspend procedure when connected to a first primary cell, and performing an RRC resume procedure, and wherein determining, for each of at least one candidate PSCell of the plurality of candidate PSCells, the a respective security key for communications between the wireless device and the candidate PSCell is performed only if the RRC resume procedure is for resuming in the first primary cell.
13. The method of any of embodiments 1 to 12, comprising, for each candidate PSCell, receiving, from a network node, a respective updated value associated with the candidate PSCell, wherein the updated value associated with the candidate PSCell is different to the value associated with the candidate PSCell and is different to the updated value associated with at least one other candidate PSCell;
wherein determining, for each of at least one candidate PSCell of the plurality of candidate PSCells, the respective security key for communications between the wireless device and the candidate PSCell comprises determining the respective security key based on the master key and the respective updated value associated with the candidate PSCell.
14. The method of any of embodiments 1 to 13, wherein the network node comprises a base station associated with a primary cell for the wireless device.
15. The method of any of the previous embodiments, further comprising:
providing user data; and
forwarding the user data to a host computer via the transmission to the base station.

Group B Embodiments

16. A method performed by a network node for determining security keys, the method comprising:
determining, for each candidate primary secondary cell (PSCell) of a plurality of candidate PSCells for conditional addition or change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell; and
sending, for each candidate PSCell, the respective security key to a respective candidate secondary node associated with the candidate PSCell.
17. The method of embodiment 16, comprising sending the values associated with the candidate PSCells and/or the master key to the wireless device.
18. The method of embodiment 16 or 17, wherein the candidate PSCells include two or more PSCells associated with a same candidate secondary node or base station, and the two or more PSCells are associated with the same value.
19. The method of embodiment 16 or 17, wherein the candidate PSCells include two or more PSCells associated with a same candidate secondary node or base station, and the two or more PSCells are associated with different values.
20. The method of any of embodiments 16 to 19, comprising sending, to the wireless device, one or more configurations for configuring the wireless device with the plurality of candidate PSCells, wherein the one or more configurations indicate the values associated with the candidate PSCells.
21. The method of any of embodiments 16 to 20, wherein the values associated with the candidate PSCells are associated with a first primary cell for the wireless device, and the method comprises:
for each candidate PSCell, sending, to the wireless device, a respective further value associated with the candidate PSCell, wherein the further value associated with the candidate PSCell is different to the value associated with the candidate PSCell and is different to the further value associated with at least one other candidate PSCell, and wherein the further values associated with the candidate PSCells are associated with a second primary cell for the wireless device.
22. The method of embodiment 21, comprising determining that the wireless device has connected to the first primary cell, and wherein determining, for each of the at least one candidate PSCell of the plurality of candidate PSCells, the respective security key for communications between the wireless device and the candidate PSCell comprises determining the security key for communications between the wireless device and a first candidate PSCell of the candidate PSCells based on based on the master key and the value associated with the candidate PSCell and the first primary cell.

23. The method of any of embodiments 16 to 20, comprising determining that the wireless device has connected to a first primary cell before sending the security keys associated with the candidate PSCells to the respective candidate secondary nodes.

24. The method of any of any of embodiments 16 to 20, comprising determining that the wireless device has suspended from and resumed to a first primary cell before sending the security keys associated with the candidate PSCells to the respective candidate secondary nodes.

25. The method of any of embodiments 16 to 24, comprising:
determining, for each candidate PSCell, a respective updated security key for communications between the wireless device and the candidate PSCell, wherein the respective updated security key is determined based on the master key and a respective updated value associated with the candidate PSCell, wherein the updated value associated with the candidate PSCell is different to the value associated with the candidate PSCell and is different to at least one other candidate PSCell.

26. The method of embodiment 25, comprising:
sending, for each candidate PSCell, the respective updated security key to the respective candidate secondary node associated with the candidate PSCell; and/or
sending the updated values to the wireless device.

27. The method of any of embodiments 20 to 26, wherein the network node comprises a base station associated with a primary cell for the wireless device.

Group C Embodiments

28. A wireless device for determining security keys, the wireless device comprising:
processing circuitry configured to perform any of the steps of any of the Group A embodiments; and
power supply circuitry configured to supply power to the wireless device.

29. A base station for determining security keys, the base station comprising:
processing circuitry configured to perform any of the steps of any of the Group B embodiments;
power supply circuitry configured to supply power to the base station.

30. A user equipment (UE) for determining security keys, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

31. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

32. The communication system of the previous embodiment further including the base station.

33. The communication system of the previous 2 embodiments, further including the UE, wherein the UE is configured to communicate with the base station.

34. The communication system of the previous 3 embodiments, wherein:
the processing circuitry of the host computer is configured to execute a host application, thereby providing the user data; and
the UE comprises processing circuitry configured to execute a client application associated with the host application.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

36. The method of the previous embodiment, further comprising, at the base station, transmitting the user data.

37. The method of the previous 2 embodiments, wherein the user data is provided at the host computer by executing a host application, the method further comprising, at the UE, executing a client application associated with the host application.

38. A user equipment (UE) configured to communicate with a base station, the UE comprising a radio interface and processing circuitry configured to performs the of the previous 3 embodiments.

39. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

40. The communication system of the previous embodiment, wherein the cellular network further includes a base station configured to communicate with the UE.

41. The communication system of the previous 2 embodiments, wherein:
   the processing circuitry of the host computer is configured to execute a host application, thereby providing the user data; and
   the UE's processing circuitry is configured to execute a client application associated with the host application.

42. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

43. The method of the previous embodiment, further comprising at the UE, receiving the user data from the base station.

44. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

45. The communication system of the previous embodiment, further including the UE.

46. The communication system of the previous 2 embodiments, further including the base station, wherein the base station comprises a radio interface configured to communicate with the UE and a communication interface configured to forward to the host computer the user data carried by a transmission from the UE to the base station.

47. The communication system of the previous 3 embodiments, wherein:
   the processing circuitry of the host computer is configured to execute a host application; and
   the UE's processing circuitry is configured to execute a client application associated with the host application, thereby providing the user data.

48. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

49. A method implemented in a communication system including a host computer, a base station and a user equipment (UE), the method comprising:
   at the host computer, receiving user data transmitted to the base station from the UE, wherein the UE performs any of the steps of any of the Group A embodiments.

50. The method of the previous embodiment, further comprising, at the UE, providing the user data to the base station.

51. The method of the previous 2 embodiments, further comprising:
   at the UE, executing a client application, thereby providing the user data to be transmitted; and
   at the host computer, executing a host application associated with the client application.

52. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

53. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

54. The communication system of the previous embodiment further including the base station.

55. The communication system of the previous 2 embodiments, further including the UE, wherein the UE is configured to communicate with the base station.

56. The communication system of the previous 3 embodiments, wherein:
   the processing circuitry of the host computer is configured to execute a host application;
   the UE is configured to execute a client application associated with the host application, thereby providing the user data to be received by the host computer.

57. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

58. The method of the previous embodiment, further comprising at the base station, receiving the user data from the UE.

59. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for determining security keys, the method comprising:
for each candidate primary secondary cell (PSCell) of a plurality of candidate PSCells for conditional addition or conditional change by the wireless device for dual connectivity, receiving, from a network node, a respective value associated with the candidate PSCell, wherein the value associated with the candidate PSCell is different to the value associated with at least one other candidate PSCell;
when a condition associated with a first candidate PSCell of the plurality of candidate PSCells is fulfilled, determining a respective security key for communications between the wireless device and the first candidate PSCell, wherein the respective security key is determined based on a master key and the respective value associated with the first candidate PSCell, wherein the values associated with the candidate PSCells are associated with a first primary cell for the wireless device;

for each candidate PSCell, receiving, from the network node, a respective further value associated with the candidate PSCell, wherein the further value associated with the candidate PSCell is different to the value associated with the candidate PSCell and is different to the further value associated with at least one other candidate PSCell, and wherein the further values associated with the candidate PSCells are associated with a second primary cell for the wireless device; and when a condition associated with a second candidate PSCell of the plurality of candidate PSCells is fulfilled, determining a respective security key for communications between the wireless device and the second candidate PSCell, wherein the respective security key is determined based on a master key and the respective further value associated with the second candidate PSCell, wherein the further values associated with the candidate PSCells are associated with a secondary primary cell for the wireless device.

2. The method of claim 1, comprising receiving the values associated with the candidate PSCells and/or the master key from a network node or base station.

3. The method of claim 1, wherein the first candidate PSCell and the second candidate PSCell are the same PSCell.

4. A computer program comprising instructions which, when executed on at least one processor, cause the at least one processor to carry out a method according to claim 1.

5. The method of claim 1, further comprising configuring the wireless device to use the first candidate PSCell as a PSCell.

6. The method of claim 1, wherein the candidate PSCells include two or more PSCells associated with a same candidate secondary node or base station, and the two or more PSCells are associated with the same value or different values.

7. The method of claim 1, comprising receiving, from the network node, one or more configurations for configuring the wireless device with the plurality of candidate PSCells, wherein the one or more configurations indicate the values associated with the candidate PSCells.

8. The method of claim 1, further comprising performing a RRC resume procedure to resume in the first primary cell, and wherein determining, for each of the at least one candidate PSCell of the plurality of candidate PSCells, the respective security key for communications between the wireless device and the candidate PSCell comprises determining the security key for communications between the wireless device and a first candidate PSCell of the candidate PSCells based on the master key and the value associated with the candidate PSCell and the first primary cell.

9. The method of claim 1, comprising performing a RRC resume procedure to resume in a first primary cell, and wherein receiving the values associated with the candidate PSCells is performed after a start of the RRC resume procedure.

10. The method of claim 1, comprising performing an RRC suspend procedure when connected to a first primary cell, and performing an RRC resume procedure, and wherein determining, for each of at least one candidate PSCell of the plurality of candidate PSCells, the a respective security key for communications between the wireless device and the candidate PSCell is performed only if the RRC resume procedure is for resuming in the first primary cell.

11. The method of claim 1, comprising, for each candidate PSCell, receiving, from a network node, a respective updated value associated with the candidate PSCell, wherein the updated value associated with the candidate PSCell is different to the value associated with the candidate PSCell and is different to the updated value associated with at least one other candidate PSCell;

wherein determining, for each of at least one candidate PSCell of the plurality of candidate PSCells, the respective security key for communications between the wireless device and the candidate PSCell comprises determining the respective security key based on the master key and the respective updated value associated with the candidate PSCell.

12. A method performed by a network node for determining security keys, the method comprising:

determining, for each candidate primary secondary cell (PSCell) of a plurality of candidate PSCells for conditional addition or conditional change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell;

sending, for each candidate PSCell, the respective security key to a respective candidate secondary node associated with the candidate PSCell;

sending, to the wireless device, one or more configurations for configuring the wireless device with the plurality of candidate PSCells, wherein the one or more configurations indicate the respective values associated with the candidate PSCells, wherein the values associated with the candidate PSCells are associated with a first primary cell for the wireless device; and for each candidate PSCell, sending, to the wireless device, a respective further value associated with the candidate PSCell, wherein the further value associated with the candidate PSCell is different to the value associated with the candidate PSCell and is different to the further value associated with at least one other candidate PSCell, and wherein the further values associated with the candidate PSCells are associated with a second primary cell for the wireless device.

13. The method of claim 12, comprising sending the values associated with the candidate PSCells and/or the master key to the wireless device.

14. The method of claim 12, wherein the candidate PSCells include two or more PSCells associated with a same candidate secondary node or base station, and the two or more PSCells are associated with the same value or different values.

15. The method of claim 12, further comprising determining that the wireless device has connected to the first primary cell, and wherein determining, for each of the at least one candidate PSCell of the plurality of candidate PSCells, the respective security key for communications between the wireless device and the candidate PSCell comprises determining the security key for communications between the wireless device and a first candidate PSCell of the candidate PSCells based on based on the master key and the value associated with the candidate PSCell and the first primary cell.

16. The method of claim 12, comprising:

determining that the wireless device has connected to a first primary cell before sending the security keys associated with the candidate PSCells to the respective candidate secondary nodes; or determining that the wireless device has suspended from and resumed to a first primary cell before sending the security keys associated with the candidate PSCells to the respective candidate secondary nodes.

17. The method of claim 12, wherein the network node comprises a base station associated with a primary cell for the wireless device.

18. Apparatus in a wireless device for determining security keys, the apparatus comprising a processor and a memory, the memory containing instructions executable by the processor such that the apparatus is operable to:
for each candidate primary secondary cell (PSCell) of a plurality of candidate PSCells for conditional addition or conditional change by the wireless device for dual connectivity, receive, from a network node, a respective value associated with the candidate PSCell, wherein the value associated with the candidate PSCell is different to the value associated with at least one other candidate PSCell;
when a condition associated with a first candidate PSCell of the plurality of candidate PSCells is fulfilled, a respective security key for communications between the wireless device and the first candidate PSCell, wherein the respective security key is determined based on a master key and the respective value associated with the first candidate PSCell, wherein the values associated with the candidate PSCells are associated with a first primary cell for the wireless device;
for each candidate PSCell, receive, from the network node, a respective further value associated with the candidate PSCell, wherein the further value associated with the candidate PSCell is different to the value associated with the candidate PSCell and is different to the further value associated with at least one other candidate PSCell, and wherein the further values associated with the candidate PSCells are associated with a second primary cell for the wireless device; and
when a condition associated with a second candidate PSCell of the plurality of candidate PSCells is fulfilled, determine a respective security key for communications between the wireless device and the second candidate PSCell, wherein the respective security key is determined based on a master key and the respective further value associated with the second candidate PSCell, wherein the further values associated with the candidate PSCells are associated with a secondary primary cell for the wireless device.

19. Apparatus in a network node for determining security keys, the apparatus comprising a processor and a memory, the memory containing instructions executable by the processor such that the apparatus is operable to:
determine, for each candidate primary secondary cell (PSCell) of a plurality of candidate PSCells for conditional addition or conditional change by a wireless device for dual connectivity, a respective security key for communications between the wireless device and the candidate PSCell, wherein the respective security key is determined based on a master key and a respective value associated with the candidate PSCell, wherein the value associated with the candidate PSCell is different to the value associated with at least one other candidate PSCell;
send, for each candidate PSCell, the respective security key to a respective candidate secondary node associated with the candidate PSCell;
send, to the wireless device, one or more configurations for configuring the wireless device with the plurality of candidate PSCells, wherein the one or more configurations indicate the respective values associated with the candidate PSCells, wherein the values associated with the candidate PSCells are associated with a first primary cell for the wireless device; and
for each candidate PSCell, send, to the wireless device, a respective further value associated with the candidate PSCell, wherein the further value associated with the candidate PSCell is different to the value associated with the candidate PSCell and is different to the further value associated with at least one other candidate PSCell, and wherein the further values associated with the candidate PSCells are associated with a second primary cell for the wireless device.

* * * * *